(12) United States Patent
Hebeisen et al.

(10) Patent No.: US 12,104,436 B2
(45) Date of Patent: *Oct. 1, 2024

(54) MULTI-STOP BRAKE FOR WINDOW SHADES

(71) Applicant: Mechoshade Systems, LLC, Middleton, WI (US)

(72) Inventors: Stephen P. Hebeisen, Amawalk, NY (US); Eugene Miroshnichenko, Oceanside, NY (US); Xi Ming Liarno, Bergenfield, NJ (US)

(73) Assignee: Mechoshade Systems, LLC, Middleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,050

(22) Filed: Oct. 12, 2023

(65) Prior Publication Data
US 2024/0052693 A1    Feb. 15, 2024

Related U.S. Application Data

(63) Continuation of application No. 17/193,246, filed on Mar. 5, 2021, now Pat. No. 11,821,259, which is a
(Continued)

(51) Int. Cl.
*E06B 9/24* (2006.01)
*E06B 9/32* (2006.01)
(Continued)

(52) U.S. Cl.
CPC ............... *E06B 9/24* (2013.01); *E06B 9/32* (2013.01); *E06B 9/68* (2013.01); *G05B 15/02* (2013.01);
(Continued)

(58) Field of Classification Search
CPC ............... H01L 29/063; H01L 29/0649; H01L 29/0692; H01L 29/402; H01L 29/47;
(Continued)

(56) References Cited

U.S. PATENT DOCUMENTS 5,437,324 A * 8/1995 Sternquist ................ E06B 9/44
                                                             160/307
5,532,560 A    7/1996 Element
(Continued)

FOREIGN PATENT DOCUMENTS

WO    2013112255    8/2013

OTHER PUBLICATIONS

UKIPO, Search Report dated Aug. 26, 2016 in GB Application No. GB1603643.6.
(Continued)

*Primary Examiner* — Kidest Bahta
(74) *Attorney, Agent, or Firm* — SNELL & WILMER L.L.P.

(57) ABSTRACT

The system includes information and data from analysis systems about optimal window covering positions that is communicated to building occupants. The analysis system communicates information to the occupant via the occupant's client computer to allow the occupant to fully or partially adjust the position of a manual shade or motorized shade, without the need for the analysis system to fully or partially electronically control the shades. The system may also adjust window covering systems and other systems to ensure desired or optimal daylight exposure in order promote optimal circadian functionality in the occupants.

18 Claims, 15 Drawing Sheets

Related U.S. Application Data continuation of application No. 16/205,598, filed on Nov. 30, 2018, now Pat. No. 10,961,772, which is a continuation of application No. 15/057,354, filed on Mar. 1, 2016, now Pat. No. 10,174,546.

(60) Provisional application No. 62/239,431, filed on Oct. 9, 2015, provisional application No. 62/127,414, filed on Mar. 3, 2015.

(51) Int. Cl.
    *E06B 9/68*     (2006.01)
    *G05B 15/02*     (2006.01)
    *H05B 47/105*     (2020.01)
    *H05B 47/11*     (2020.01)

(52) U.S. Cl.
CPC ........... *H05B 47/105* (2020.01); *H05B 47/11* (2020.01); *E06B 2009/2417* (2013.01); *E06B 2009/6818* (2013.01); *G05B 2219/2642* (2013.01); *Y02A 30/24* (2018.01); *Y02B 20/40* (2013.01); *Y02B 80/00* (2013.01)

(58) Field of Classification Search
CPC ... H01L 29/872; H01L 25/00; H01L 2221/00; H01L 23/00
See application file for complete search history.

(56) References Cited

U.S. PATENT DOCUMENTS

| | | | |
|---|---|---|---|
| 5,648,656 | A | 7/1997 | Begemann |
| 5,927,370 | A * | 7/1999 | Judkins ................... E06B 9/262 160/321 |
| 6,024,156 | A | 2/2000 | Chu |
| 7,091,973 | B1 | 8/2006 | Cohen |
| 2002/0175941 | A1 | 11/2002 | Hand |
| 2003/0015301 | A1 | 1/2003 | Killo |
| 2004/0107655 | A1 | 6/2004 | Hudoba |
| 2006/0021714 | A1 | 2/2006 | Carmen, Jr. |
| 2006/0061118 | A1 | 3/2006 | Golden |
| 2008/0236763 | A1 | 10/2008 | Kates |
| 2008/0266297 | A1 | 10/2008 | Leah |
| 2009/0020233 | A1 | 1/2009 | Berman |
| 2009/0254222 | A1 * | 10/2009 | Berman ................... E06B 9/322 160/1 |
| 2010/0087958 | A1 | 4/2010 | Mullet |
| 2011/0164304 | A1 | 7/2011 | Brown et al. |
| 2012/0029704 | A1 | 2/2012 | Ackermann |
| 2012/0133315 | A1 | 5/2012 | Berman |
| 2013/0057937 | A1 | 3/2013 | Berman |
| 2013/0180676 | A1 | 7/2013 | Berman |
| 2013/0229114 | A1 | 9/2013 | Eisele |
| 2014/0156079 | A1 | 6/2014 | Courtney |
| 2014/0196857 | A1 * | 7/2014 | Bergamaschi ............ E06B 9/84 160/298 |
| 2014/0288715 | A1 | 9/2014 | Beaujeu |
| 2014/0359976 | A1 | 12/2014 | Lu |
| 2015/0136342 | A1 | 5/2015 | Clements |
| 2016/0040478 | A1 | 2/2016 | Lundy |
| 2017/0226799 | A1 | 8/2017 | Hebeisen |

OTHER PUBLICATIONS

Figueiro, et al., "Spectral Sensitivity of the Circadian System," Proceedings of the SPIE, vol. 5187, 8 pages, 2004.
Figueiro, "Research Recap" Lighting Design + Application, vol. 33, No. 2, Feb. 2003, 3 pages.
USPTO; Non-Final Office Action dated Feb. 22, 2018 in U.S. Appl. No. 15/057,354.
USPTO; Final Office Action dated May 8, 2018 in U.S. Appl. No. 15/057,354.
USPTO; Advisory Action dated Jul. 10, 2018 in U.S. Appl. No. 15/057,354.
USPTO; Non-Final Office Action dated Oct. 4, 2018 in U.S. Appl. No. 15/057,354.
USPTO; Notice of Allowance dated Nov. 21, 2018 in U.S. Appl. No. 15/057,354.
UKIPO; Examination Report dated Oct. 13, 2020 in GB Application No. 1603643.6.
USPTO; Non-Final Office Action dated May 29, 2020 in U.S. Appl. No. 16/205,598.
USPTO; Final Office Action dated Aug. 20, 2020 in U.S. Appl. No. 16/205,598.
USPTO; Advisory Action dated Sep. 9, 2020 in U.S. Appl. No. 16/205,598.
USPTO; Non-Final Office Action dated Oct. 16, 2020 in U.S. Appl. No. 16/205,598.
USPTO; Notice of Allowance dated Dec. 1, 2020 in U.S. Appl. No. 16/205,598.
UKIPO; Examination Report dated Jul. 19, 2021 in GB Application No. 1603643.6.
UKIPO; Examination Report dated Sep. 21, 2021 in GB Application No. 1603643.6.
USPTO; Non-Final Office Action dated Dec. 8, 2022 in U.S. Appl. No. 17/193,246.
USPTO; Final Office Action dated Apr. 6, 2023 in U.S. Appl. No. 17/193,246.
USPTO; Advisory Action dated Jun. 2, 2023 in U.S. Appl. No. 17/193,246.
USPTO; Non-Final Office Action dated Jun. 30, 2023 in U.S. Appl. No. 17/193,246.
USPTO; Notice of Allowance dated Oct. 6, 2023 in U.S. Appl. No. 17/193,246.

* cited by examiner

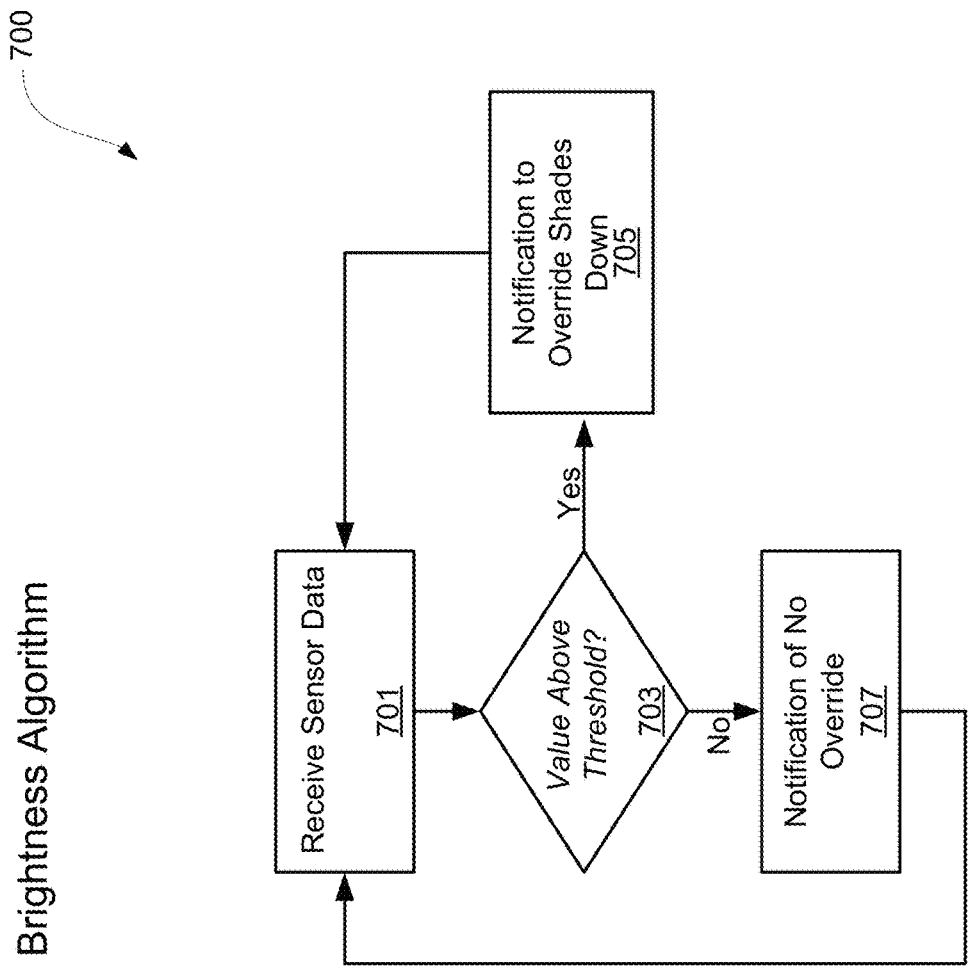

MULTI-STOP BRAKE FOR WINDOW SHADES

CROSS-REFERENCE TO RELATED APPLICATIONS

This application is a continuation of, claims priority to and the benefit of, U.S. Ser. No. 17/193,246 filed on Mar. 5, 2021 and entitled "Multi-Stop Manual Window Shade". The '246 application is a continuation of, claims priority to and the benefit of, U.S. Ser. No. 16/205,598 filed on Nov. 30, 2018 and entitled "Adjustment Notification Method", (nka U.S. Pat. No. 10,961,772 issued on Mar. 30, 2021). The '598 application is a continuation of U.S. Ser. No. 15/057,354 filed Mar. 1, 2016, entitled "Shade Adjustment Notification System and Method" (nka U.S. Pat. No. 10,174,546 issued on Jan. 8, 2019). The '354 application claims priority to, and the benefits of, U.S. Provisional Ser. No. 62/127,414 filed on Mar. 3, 2015, entitled "Shade Adjustment Notification System and Method" and U.S. Provisional Ser. No. 62/239,431 filed on Oct. 9, 2015, entitled "Shade Adjustment Notification System and Method". All of which are hereby incorporated by reference in their entirety for all purposes.

FIELD

This disclosure generally relates to window covering systems, and more particularly, to a system and method for sending notifications about suggested window covering adjustments.

BACKGROUND

The mentality of how a building should feel is changing. The systematic approach of over-cooling the entire office at one temperature in the summer and over-heating the entire office in the winter is not acceptable, not energy-efficient and not cost-efficient.

In a more progressive workplace, occupants prefer to maintain environmental control over their workspace, and such control has proven to increase worker productivity. Companies and individuals often want to achieve the most energy-efficient work and living space possible, but they often have a limited budget. While many automation systems exist, such systems are typically more expensive and outside of a limited budget. Budget is almost always the inhibiting factor when considering the purchase of building/home automated control systems for shades, lights, HVAC (heating, ventilation, and air conditioning) and/or A/V. Automation often has a poor return on investment due to expensive wiring costs, especially for retrofit projects. As such, when a company cannot afford automation, the company is usually only able to install manual shades.

However, a need exists to adjust (e.g., raise and lower) the window coverings at specific times in order to optimize the dimmable lighting and HVAC systems. For example, by raising the window coverings every morning, the dimmable lighting system and the HVAC would adjust to having natural light and heat entering the space. Essentially, raising and lowering the shades may be one key to jump starting all of the building's systems. For additional ways to improve workplace performance, see "Workplace Strategies that Enhance Performance, Health and Wellness" by Gordon Wright, Director of Consulting, at HOK (http://www.hok-.com/thought-leadership/workplace-strategies-that-enhance-human-performance-health-and-wellness/), which is incorporated herein by reference in its entirety.

Therefore, a need exists for notifying individuals of the preferred, optimal and/or desired times to adjust window coverings and/or other systems.

SUMMARY

In various embodiments, the system may be configured to model at least a portion of a building and at least a portion of the surroundings of a building to create a shadow model, use the shadow model to calculate the presence of calculated shadow at a location of interest and communicate to a client computer information regarding the presence of calculated shadow at the location of interest. The system may also be configured to communicate to a client computer a suggested adjustment to an artificial lighting control system. The system may also be configured to communicate the information to at least one of an automated shading system, a building management system, an artificial lighting control system, a glass controller or an HVAC system. The information regarding the presence of calculated shadow at the location of interest may be communicated to the client computer in advance of when the calculated shadow is calculated to be present at the location of interest. The information regarding the presence of calculated shadow at the location of interest may be configured to instruct a building management system to adjust a heating, ventilation, or air conditioning setting associated with the location of interest.

In various embodiments, the system may also be configured to include modeling, by an automated control system, at least a portion of a building and at least a portion of the surroundings of a building to create a reflectance model; using, by the automated control system, the reflectance model to calculate the presence of calculated reflected light at a location of interest; and communicating, to a client computer, information regarding the presence of calculated reflected light at the location of interest. The information regarding the presence of calculated reflected light at the location of interest may be used by the client computer to instruct the artificial lighting control system to modify an artificial lighting setting associated with the location of interest. The information regarding the presence of calculated reflected light at the location of interest may further be communicated by the client computer to the building management system in advance of when the calculated reflected light is calculated to be present at the location of interest.

In various embodiments, the system may also be configured to include comparing, by an automated control system, a measured radiation value obtained from a radiometer to a predicted radiation value generated by a clear sky algorithm to obtain a comparison value; and communicating, by the automated control system and to a client computer, the comparison value. The information associated with the comparison value may be used to instruct the artificial lighting control system to modify an artificial lighting setting associated with the location of interest. The clear sky algorithm may be an ASHRAE clear sky algorithm. The system may also include communicating, responsive to the comparison value and to a client computer, information for adjusting a glass controller, wherein the glass controller is configured to adjust a variable characteristic of a glass.

In various embodiments, the system may also be configured to include comparing, by an automated control system, a measured radiation value obtained from a radiometer to a predicted radiation value generated by a clear sky algorithm to obtain a comparison value; and communicating, by the automated control system and to a client computer, an instruction associated with the comparison value. The instruction may include the comparison value. The information associated with the comparison value may be used to instruct the artificial lighting control system to modify an artificial lighting setting associated with the location of interest. The system may further be configured for communicating, responsive to the comparison value and to a client computer, information for adjusting a glass controller, wherein the glass controller is configured to adjust a variable characteristic of a glass.

In various embodiments, the system may also be configured to include controlling a glass having a variable characteristic. The controlling may include using, by an automated control system, information related to at least one of solar penetration through the glass or solar load on the glass to establish a standard management routine for the glass; and communicating, by the automated control system and to a client computer, information regarding a deviation from the standard management routine arising from an override condition. The system may include communicating the information regarding the deviation to at least one of an automated shading system, a building management system, an artificial lighting control system, a glass controller or an HVAC system. The override condition is at least one of: determining, by the automated control system, the presence of calculated reflected light on the glass; determining, by the automated control system, the presence of calculated shadow on the glass; determining, by the automated control system, a modelled brightness value indicating the presence of excessive brightness at the glass; or determining, by the automated control system, that at least one of an actual British thermal unit (BTU) load on the glass or a calculated BTU load on the glass exceeds a predetermined value. The communicating to the client computer may be performed in advance of a change in the environment of the glass. The communicating to the client computer results in an instruction to a building management system to adjust a heating, ventilation, or air conditioning setting associated with the location of interest. The system may be further configured for communicating, from a client computer and to a first glass controller, a first instruction configured to adjust a variable characteristic of a first glass in a first band; and communicating, from the client computer and to the first glass controller, a second instruction configured to adjust the variable characteristic of the first glass in a second band.

In various embodiments, the system may also be configured to analyze, by a control computer, circadian rhythms to determine an adjustment to optimize the circadian rhythms; and provide, by the control computer, a notification to a user to make the adjustment based on the analysis, wherein, to optimize the circadian rhythms, the user adjusts at least one of: a window, window properties, window covering, lighting system, air conditioning, or building management system.

BRIEF DESCRIPTION OF THE DRAWING FIGURES

The features and advantages of the present disclosure will become more apparent from the detailed description set forth below when taken in conjunction with the drawings. The left-most digit of a reference number identifies the drawing in which the reference number first appears.

FIG. 7A illustrates a flowchart of exemplary brightness sensing and notification in accordance with various embodiments;

DETAILED DESCRIPTION

Figure 1:
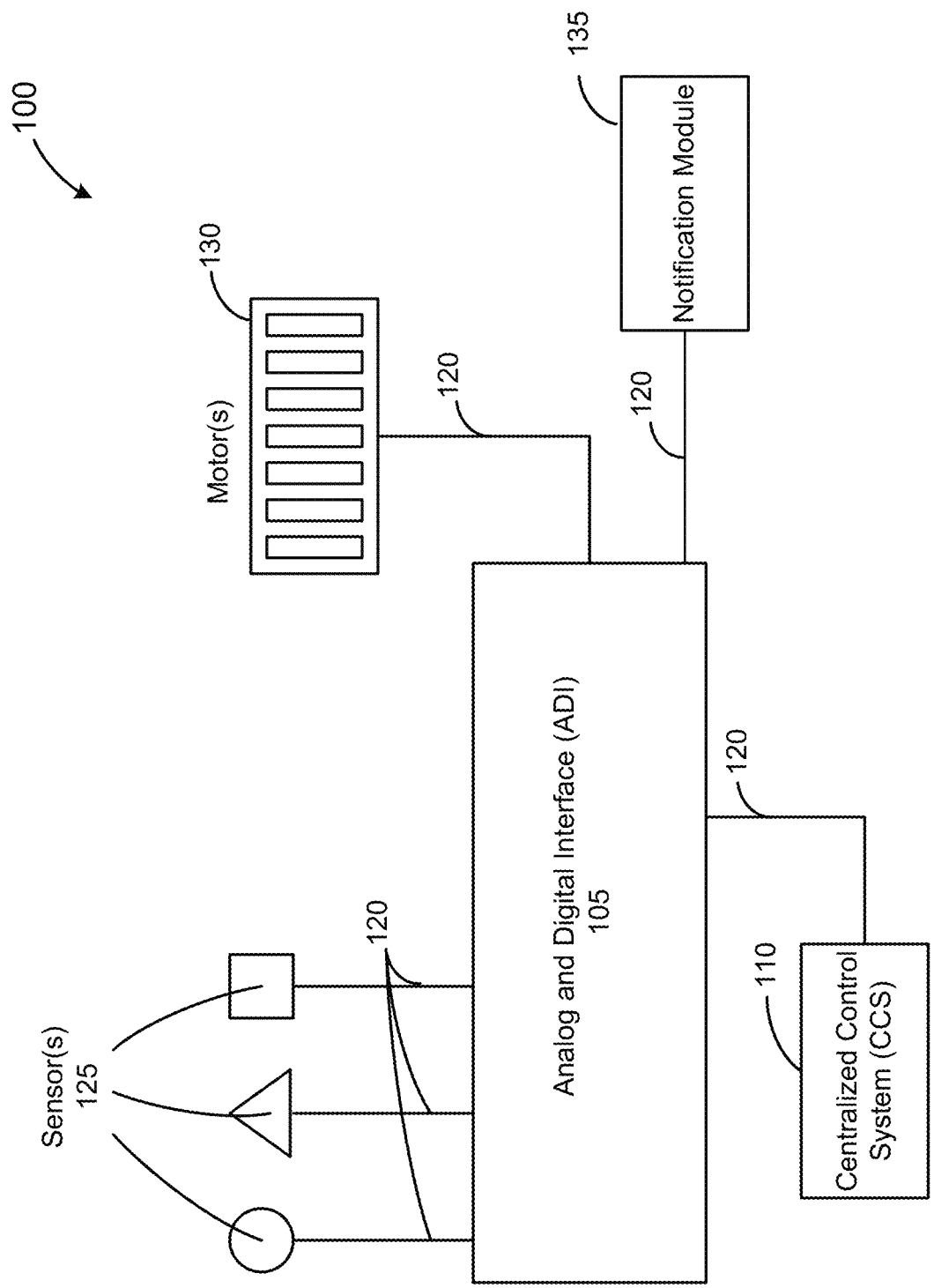
FIG. 1 illustrates a block diagram of an exemplary automated shade control and notification system in accordance with various embodiments.

The detailed description discusses various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment. For example, any reference to a singular window covering includes one or more window coverings, and any reference to more than one window covering may include a singular window covering.

Moreover, the disclosure may include the phrases window covering, window shade, shade and/or the like, and such phrases may have similar meaning to include any type of window covering (textile, roller shade, louver, awnings, blinds, etc.) or other coverings for any wall or opening (skylights, access areas, stages, displays, etc.). While the disclosure may discuss a motor moving the shades, the disclosure contemplates any of such movements being completed partially or fully manually (e.g., after receiving notifications with information about suggested movements), the movements may be automated followed by manual movements, manual movements followed by automated movements, manual overrides, automated overrides and/or any other combinations. Additionally, the system may provide notifications before, during and/or after any of the calculations/analyses discussed herein. The notifications may include suggested movements. The notifications may also include information about automated movements, if manual movements are or are not implemented. The notifications may also include a time period for the user to implement the manual adjustments, or the system may notify other users, notify other systems and/or implement automated movements.

The system utilizes analysis systems to communicate optimal shade positions to building occupants. The buildings may include residential, industrial or commercial buildings. The analysis system may include, for example, the SolarTrac system offered by MechoShade Systems, Inc. of Long Island City, New York. An analysis system may include three roof-mounted radiometers that monitor sky conditions in real time. The system may provide solar evaluation and utilize algorithms which analyze raw solar-sensor data to determine the sky condition, including clear or cloudy conditions. The automation and analysis algorithms can involve a variety of sources in order to optimize the settings for these building systems. For further details about the automation algorithms and systems, see the subject matter in U.S. Pat. No. 8,890,456 issued on Nov. 18, 2014 entitled "BRIGHTNESS MODEL" (aka U.S. patent application Ser. No. 13/671,018 filed on Nov. 7, 2012) and PCT Application No. PCT/US13/66316 filed on Oct. 23, 2013 entitled "AUTOMATED SHADE CONTROL SYSTEM UTILIZING BRIGHTNESS MODELING," both of these applications are incorporated herein by reference in their entireties for all purposes.

The analysis system communicates information to the occupant via the occupant's client computer (e.g., desktop computer, personal digital assistant, cell phones, pager, graphic display, or any other communication system or method) to allow the occupant to fully or partially adjust the position of a manual shade or motorized shade, without the need for the analysis system to fully or partially electronically control the shades. The communication may be implemented in any channel (as set forth in more detail below) such as the Internet, intranet, the cloud, email, text, radio broadcast, cellular communication, instant messaging, social network website and/or the like.

The system may communicate the same information to all or a subset of occupants. In various embodiments, the system may obtain and/or receive information from the occupant (or the occupant's surroundings), wherein the occupant information may change or impact the information the system provides to the occupant. The system may obtain information by acquiring GPS coordinates of the occupant, the occupant's surroundings (e.g., windows that impact the occupant workspace) or the occupant's client computer (e.g., smart phone). The system may obtain information about the occupant, the occupant's surroundings or the client computer from locator systems or apps (e.g., Foursquare, Life 360, etc.) or from social media (e.g., Facebook, Twitter, etc.). The system may provide different shade adjustment options to the occupant, based on the information obtained about and/or received from the occupant. For example, an occupant may input the building, the building components, the window and/or the occupant geographic or environmental information (e.g., latitude and solar orientation of the window(s) under consideration). If two or more different orientations exist, the system may provide a unique sound and/or icon that appears on a user device for each window or portion of a window (e.g., glazed element).

One skilled in the art will appreciate that the use of phrases similar to "adjustments" in the present notification and manual adjustment system may include full manual adjustments by an occupant or other person, further notification to maintenance people to provide the manual adjustments, partial manual adjustments, overrides of automated adjustments, manual adjustments along with automated adjustments, slowing down automated adjustments, increasing automated adjustments, re-programming automated adjustments, altering automated adjustments, manually activating an automated adjustment and/or the like.

While the disclosure may be described with respect to window shading systems, the system can also provide information for adjusting lighting control, HVAC control, glass control and a/v control. The system can communicate some or all of the analysis and/or notification data with only the occupant, or the system can also communicate some or all of the analysis and/or notification data with other systems. In that regard, the system can partially or fully control (or override) such systems, and/or the system can allow the occupant to partially or fully control (or override) such systems. For example, the system can provide a suggestion to an occupant's iPhone to adjust a window covering two feet downward. The occupant can then manually adjust the shade downward, activate a switch to adjust the shade downward, activate an app on the iPhone which communicates with a separate system for adjusting the shade downward, and/or using any other system or method for moving the shade. The user may manually adjust a window covering by pulling down or pushing up on the shade material, rotating (counterclock-wise or clockwise) a chain through a sprocket, rolling or unrolling the shade rod, pull cords, roller bars, drawstrings, ties, pulleys, levers, and/or any other type of device configured to facilitate adjusting, opening, closing, and/or varying window coverings and/or the like.

The analysis system can communicate to the client computer one or more of: raw data, graphic data, links to other data or websites, activation buttons, adjustment buttons/sliders, suggestions for how to adjust other systems, suggestions for timing or time periods to adjust certain systems, outcomes if certain systems are adjusted, suggestions for not adjusting other systems, estimated cost savings from adjusting other systems, estimated costs from not adjusting other systems, suggestions for increased cost savings from adjusting other systems, comfort levels from adjusting other systems, impact on other occupants from adjusting other systems, impact on other systems and/or the like. The system can incorporate additional data into its analysis such as the occupant's calendar information (e.g., on vacation for 1 week), the company's calendar information (e.g., company holiday party), information from other systems (e.g., lighting control, HVAC control, glass control and a/v control), preferences, profiles, social media information (e.g., Twitter, Facebook, etc.), regional event information (e.g. parade in front of the building).

In various embodiments, the benefits of automation (for optimizing the home/building environment) are provided, without incurring the associated high costs. The system prompts the occupants on what changes to implement in their environment and when. In other words, the system informs the occupant when to make changes to the settings for devices such as window coverings, lights, thermostats, etc. in order to optimize the environment for any combination of preferences (e.g., visual comfort, thermal comfort, energy conservation, privacy, view, code compliance, performance, scenes, personal preference, etc.). The notifications and manual adjustments may be done in lieu of equipping the system with electronic control over these devices directly. The system may include a cloud-based solution or a controller-based solution.

The system may be considered an upgrade from manual shading. The system may expose clients to the benefit of an analysis system. This enables clients to view the benefits of how an analysis system works, and may entice clients to invest money in an automated system for future projects. Most clients have multiple buildings and office spaces, so by seeing how important window covering position is throughout the day in one space may help justify the expense in another project.

The system may also encourage developers and architects to make a building "automation ready". In a building with multiple tenants, an owner can prepare their building to be "automation ready." When a tenant moves in, they can choose to either have automated window coverings or the system disclosed herein with manual window coverings. By implementing technology into manual window coverings, the market may have a better understanding of such technological capabilities. The system also entices clients to upgrade to motorized window coverings from manual window coverings. Once technology and wiring costs are reduced, these clients may be the first to adopt automation and motors.

In various embodiments, the analysis systems may include outdoor environmental conditions such as, for example, exterior daylight sensors or photosensors (visible light spectrum) in the form of global horizontal, vertical, diffuse or direct beam; radiometers (visible light and IR spectrum) in the form of diffuse or direct beam; thermometers; solar angle tracking/calculating; building and window geometry (orientation of facades, overhangs, slope of glazing, window sill height above floor, window height above floor, etc.); humidity sensors; wind sensors; internet-based weather sources; satellite imagery; historical databases of weather, solar radiation, etc.; utility power grid commands for load shedding and other utility programs; and/or utility feedback of power usage.

In various embodiments, the analysis systems may include internal environmental conditions such as, for example, daylight sensors including horizontal (e.g., tabletop, floor, ceiling, etc.), vertical (e.g., through window) and/or angular; illuminance sensors targeting interior surfaces (e.g., horizontal working plane, vertical wall surfaces, etc.); contrast ratio sensing (e.g., window/daylight condition, interior vertical wall surfaces, interior horizontal working surfaces and/or floor surfaces, display luminance, all compared to manage ratios); occupancy/vacancy sensors; temperature sensors/thermostats/black body radiators; humidity sensors; schedulers; and/or current/power sensors for key electrical loads In various embodiments, the analysis systems may include algorithms such as, for example, scheduler; threshold control based on external or internal environmental condition input; scene definition; solartracking (e.g., solar penetration, solar heat gain); shadow (e.g., 3d urban modeling, artificial horizon); reflection (3d urban modeling); brightness and/or virtual brightness; manual override control and tracking; logging and reporting; special modes, etc.; social GPS tracking (e.g., identifying local conditions that are similar and when someone overrides one of those window coverings, notify others that they may want to do the same—similar to Waze, etc.); daylight harvesting control for lighting control; artificial intelligence/self-learning (e.g., User can log when they manual override the window covering. Program logs the pertinent environmental conditions at the time and performs trending. When similar conditions come up again it recommends that the user may want to override the window coverings based on previous history); utility load shedding program (e.g., override electrical loads based on leveraged utility rates or demand emergencies); utility programs for leveraged rates; Energystar programs; optimized lighting control program which tunes lighting performance based on task tuning, scheduling, occupancy, daylight harvesting, variable load shedding, personal control; personal green dashboard tracks the energy efficiency of the user and compares to others either in same building and/or in local vicinity (could be linked into utility programs for leveraged rate).

In various embodiments, the analysis systems may include manual window covering or window covering (e.g., shade, blind, awning, drapery, etc.); standard chain or cord operated window covering; multistop-stop manual window covering (e.g., employs LAM and decelerator where a bead keeper or other feature defines one or more presets the shade can be aligned with so that a program can manage the depth of penetration on the solar ray); manual shade+scheduler (similar to above except automation is not needed and the user can preprogram set positions for the day which factor work schedule); manual shade+daylight sensor (similar to above except a daylight sensor is placed in the window which identifies the optimal position for the shade based on the amount of daylight incident on the window surface); manual shade+internet weather (similar to above except internet weather sources provide information on local weather which identifies the optimal position for the shade based on local weather/sky conditions); manual shade+daylight sensor; manual shade+automation app; manual shade+any combination of automation app, internet supplied weather conditions, scheduler and/or daylight sensor; manual shade+any combination of above+social GPS tracking; manual shade+any combination of above+social GPS tracking+artificial intelligence; manual shade+any combination of above+social GPS tracking+artificial intelligence+utility load shed or local rate programs.

Figure 11:
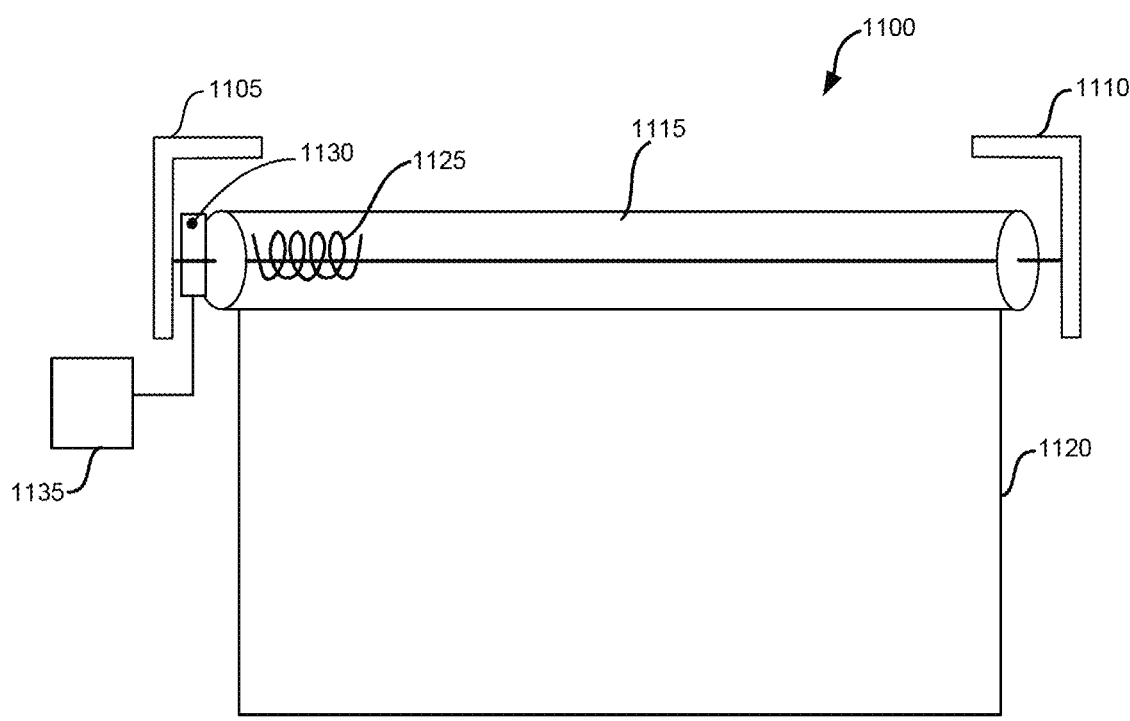
FIG. 11 shows an exemplary diagram of a window shade system having a spring assembly and brake device, in accordance with various embodiments.

In various embodiments, the system may include similar options as above but with a Manual Shade+Electronic Brake. More particularly, with respect to FIG. 11, the system 1100 may include a drive bracket 1105, an idle bracket 1110, a shade tube 1115, a window shade 1120, a spring assembly 1125, a brake device 1130 and a controller 1135. Such a system includes a multi-stop manual shade, but instead of using a traditional mechanical means to hold the shade in a specific position, this device employs a solenoid or other brake mechanism 1130 to hold the shade 1120 in a specific position. The brake 1130 could act against the chain or it could brake against an internal mechanism in the shade 1120 like the rotating hub. This brake 1130 can be electronically controlled with controller 1135 and offer the ability to track the shade 1120 position (via time or via encoder, etc.) and stop the shade 1120 at the specific multi-stop positions. The electronics may be coupled to a scheduler directly, or communicate wirelessly over Bluetooth, WIFI, etc. to a remote controller 1135. The remote controller 1135 can be a smartphone or other user input device. The manual shade 1120 may be designed with an included spring assembly 1125 which predisposes the shade 1120 to move either to the full up or full down position, unless the external brake 1130 holds the shade 1120 in a single place. An act of manual intervention may charge/load the spring by moving the shade to the opposite position which engages the automated brake 1130. The brake 1130 may release the shade at times specified by a programmable schedule or through the automation system schedule mentioned above provided by controller 1135. As an example, at night, people lower the shades for privacy. For an East facing shade in a SouthWest location, automation technology may release the shade to full open in steps until the sun is completely off the façade, at which point the shade could be fully up. If sky changes occur which result in a desire for moving the shade back down, then occupants would be notified through the app or other means of visual communication to reset the shade. This represents an optimized cost option between manual shade and motorized shade. In various embodiments, the system may include similar options as above but with a motorized Shade instead of Manual Shade or Manual Shade+Electronic Brake.

In various embodiments, the system may also adjust window covering systems and other systems to ensure desired or optimal daylight exposure in order promote optimal circadian functionality in the occupants. This in turn may promote health and productivity. In various embodiments, the control algorithms and/or manual shade automation algorithms can include such features. For example, the system may analyze circadian rhythms and provide a notification to the user to adjust the window, window properties, window covering, lighting system, air conditioning, and/or any other building management system to optimize the circadian rhythms. Such notifications may be in conjunction with the other notifications and data discussed herein. The system may also automatically adjust such systems.

Circadian rhythms are biological rhythms that repeat approximately every 24 hours. The light/dark cycle is the main synchronizer of the natural pacemaker to the 24-hour solar day. Daylight exposure may be associated with, and improved by, input from circadian rhythms. Circadian rhythms are based on certain factors such as, for example, people get more light at work than anywhere else, people on north side and near windows get the most light, indoor light exposure can increase the sleep efficiency at night, computers cause us to reduce the amount of daylight in a space, activity Index tracks the Circadian Stimulus very strongly and people spend about 93% of time indoors.

Five basic characteristics of light include quantity, spectrum, distribution, timing and duration. Other factors to consider include light not just being to support vision requirements in order to facilitate work/tasks taking place in a space. Light exposure can impact the circadian rhythms in occupants which thereby can impact overall health, alertness and thereby the effectiveness of occupants in a space. Light is the main input to synchronize the biological clock to the solar day. If people are not exposed to a sufficient amount of light of the right spectrum for a sufficient amount of time our clocks become de-synchronized which negatively impacts physiological functions, neurobehavioral performance and the sleep/wake cycle.

Unfortunately there is typically no one best schedule. Many factors must be considered including, for example, the census and acuity of the group of people occupying a specific department, individual group member's preferences, group size, age of individuals, gender, shift being worked, etc. Other issues are number of night shifts in a row and shift length. Night shift work often times applies artificial light control to optimize the biological clocks of employees for working these hours.

In various embodiments, the system optimizes or improves exposure to proper daylight levels, for example, during day shift since shades can regulate this exposure. The system can recommend to a lighting system certain compensation strategies when proper amounts of daylight or other light are not available to meet the requirements. These strategies may change seasonally, and can help offset depression and lost efficiency especially during winter conditions for people in northern-most climates. A general guideline for dayshift work is as follows: Exposure to 1Klux or more is required of 420-480 nm spectrum and timing is in the morning with a duration of 1-2 hours.

In various embodiments, the system can help regulate the exposure requirements and choose times when the exposure will least detract from thermal and visual comfort. In various embodiments, the system can plan the exposure based on the system's database of information related to a zone's solar orientation and exposure relative to real time lighting conditions. In various embodiments, the system can further optimize this based on predictive inputs such as satellite feeds on local weather and the use of devices that capture pictures of the sky.

In various embodiments, the system could be pre-programmed with information about the occupants that help personalize the thresholds for the amount of exposure to daylight spectrum desired in order to optimize activity. Average requirements and/or minimum requirements could drive the control strategy. Furthermore, information of the internal and external surroundings can also be used in order to help define true exposure levels for the occupants, which in turn may affect the control timing for daylight exposure.

Knowledge about surrounding artificial light conditions may also be programmed into a zone in order to help formulate alternative strategies when the external light conditions cannot meet the thresholds. Such light may include, for example, noontime daylight spectrum, CCT range for solid state lighting products (LED), incandescent, fluorescent and/or metal halide.

FIG. 1 illustrates an exemplary automated shade control and/or notification (ASCN) system 100 in accordance with various embodiments. ASCN 100 may comprise an analog and digital interface (ADI) 105 configured for communicating with centralized control system (CCS) 110, motors 130, sensors 125 and notification module 135. ADI 105 may communicate with CCS 110, motors 130, sensors 125, notification module 135 and/or any other components through communication links 120. For example, in one embodiment, ADI 105 and CCS 110 are configured to communicate directly with motors 130 and/or notification module 135 to minimize lag time between computing commands, notification and/or motor movement.

As discussed herein, in various embodiments, ASCN 100 may or may not include motors 130 or CCS 110. ASCN 100 may send a notification via notification module 135 for the user to adjust certain shades manually, without sending any instructions for automated movement of the shades. In addition to the notification, ASCN 100 may also instruct the same shades, a subset of the same shades or other shades to automatically move via CCS 110 and/or motors 130.

ADI 105 may be configured to facilitate transmitting notifications, shade position commands and/or other commands. ADI 105 may also be configured to interface between notification module 135, CCS 110 and motors 130. ADI 105 may be configured to facilitate user access to notification module 135 and/or motors 130. By facilitating user access, ADI 105 may be configured to facilitate communication between a user and motors 130 and/or notifications. For example, in response to the user receiving a notification to adjust certain shades, ADI 105 may allow a user to access some or all of the functions of motors 130 for any number of zones. ADI 105 may use communication links 120 for communication, user input, and/or any other communication mechanism for providing user access.

ADI 105 may be configured as hardware and/or software. While FIG. 1 depicts a single ADI 105, ASCN 100 may comprise multiple ADIs 105. In one embodiment, ADI 105 may be configured to allow a user to control motors 130 for multiple window coverings. As used herein, a zone refers to any area of a structure wherein ASCN 100 is configured to provide notifications from the sensors and algorithms, and/or control the shading. For example, an office building may be divided into eight zones, each zone corresponding to a different floor. Each zone, in turn may have 50 different glazings, windows and/or window coverings. Thus, ADI 105 may facilitate notifying a user about controlling each window covering in each zone, some or all window coverings for some or all floors (or portion thereof), and/or multiple ADIs 105 (i.e., two, four, eight, or any other suitable number of different ADIs 105) may be coupled together to collectively provide notifications to adjust some or all window coverings, wherein each ADI 105 provides notifications for the window coverings for each floor. Moreover, ASCN 100 may log, record, classify, quantify, and otherwise measure and/or store information related to one or more window coverings. Additionally, each ADI 105 may be addressable, such as via an internet protocol (IP) address, a MAC address, and/or the like.

ADI 105 may also be configured with one or more safety mechanisms. For example, ADI 105 may comprise one or more override buttons to facilitate manual operation of one or more window coverings, motors 130 and/or ADIs 105. ADI 105 may also be configured with a security mechanism that requires entry of a password, code, biometric, or other identifier/indicia suitably configured to allow the user to interact or communicate with the system, such as, for example, authorization/access code, personal identification number (PIN), Internet code, bar code, transponder, digital certificate, biometric data, and/or other identification indicia.

CCS 110 may be used to facilitate communication with and/or control of ADI 105. CCS 110 may be configured to facilitate computing of one or more algorithms to determine, for example, solar radiation levels, sky type (such as clear, overcast, bright overcast, and/or the like), interior lighting information, exterior lighting information, temperature information, glare information, shadow information, reflectance information, and the like. CCS 110 algorithms may include proactive and reactive algorithms configured to provide appropriate solar protection from direct solar penetration; reduce solar heat gain; reduce radiant surface temperatures and/or veiling glare; control penetration of the solar ray, optimize the interior natural daylighting of a structure and/or optimize the efficiency of interior lighting systems. CCS 110 algorithms may operate in real-time. CCS 110 may be configured with a RS-485 communication board to facilitate receiving and transmitting data from ADI 105. CCS 110 may be configured to automatically self-test, synchronize and/or start the various other components of ASCN 100. CCS 110 may be configured to run one or more user interfaces to facilitate user interaction. An example of a user interface used in conjunction with CCS 110 is described in greater detail below.

CCS 110 may be configured as any type of computing device, personal computer, network computer, work station, minicomputer, mainframe, or the like running any operating system such as any version of Windows, Windows NT, Windows XP, Windows 2000, Windows 98, Windows 95, MacOS, OS/2, BeOS, Linux, UNIX, Solaris, MVS, DOS or the like. The various CCS 110 components or any other components discussed herein may include one or more of the following: a host server or other computing system including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. The user may interact with the system via any input device such as a keypad, keyboard, mouse, kiosk, personal digital assistant, handheld computer (e.g., Palm Pilot®, Blackberry®), cellular phone and/or the like.

CCS 110 may also be configured with one or more browsers, remote switches and/or touch screens to further facilitate access and control of ASCN 100. For example, each touch screen communicating with CCS 110 can be configured to facilitate control of a section of a building's floor plan, with motor zones and shade zones indicated (described further herein). A user may use the touch screen to select a motor zone and/or shade zone to provide control and/or obtain control and/or alert information about the shade position of that particular zone, current sky condition information, sky charts, global parameter information (such as, for example, local time and/or date information, sunrise and/or sunset information, solar altitude or azimuth information, and/or any other similar information noted herein), floor plan information (including sensor status and location) and the like. The touch screen may also be used to provide control and/or information about the brightness level of a local sensor, to provide override capabilities of the shade position to move a shade to a more desired location, and/or to provide access to additional shade control data that is captured for each particular zone. The browser, touch screen and/or switches may also be configured to log user-directed movement of the shades, manual over-rides of the shades, and other occupant-specific adaptations to ASCN 100 and/or each shade and/or motor zone. As another example, the browser, touch screen and/or switches may also be configured to provide remote users access to particular data and shade functions depending upon each remote user's access level. For example, the access levels may, for example, be configured to permit only certain individuals, levels of employees, companies, or other entities to access ASCN 100, or to permit access to specific ASCN 100 control parameters. Furthermore, the access controls may restrict/permit only certain actions such as opening, closing, and/or adjusting shades. Restrictions on radiometer controls, algorithms, and the like may also be included.

CCS 110 may also be configured to be responsive to one or more alarms, warnings, error messages, and/or the like. For example, CCS 110 may be configured to move one or more window coverings responsive to a fire alarm signal, a smoke alarm signal, or other signal, such as a signal received from a building management system. Moreover, CCS 100 may further be configured to generate one or more alarms, warnings, error messages, and/or the like. CCS 110 may transmit or otherwise communicate an alarm to a third party system, for example a building management system, as appropriate.

CCS 110 may also be configured with one or more motor controllers. The motor controller may be equipped with one or more algorithms which enable it to position the window covering based on automated and/or manual control from the user through one or a variety of different user interfaces which communicate to the controller. CCS 110 may provide control of the motor controller via hardwired low voltage dry contact, hardwired analog, hardwired line voltage, voice, wireless IR, wireless RF or any one of a number of low voltage, wireless and/or line voltage networking protocols such that a multiplicity of devices including, for example, switches, touch screens, PCs, Internet Appliances, infrared remotes, radio frequency remotes, voice commands, PDAs, cell phones, PIMs, etc. are capable of being employed by a user to automatically and/or manually override the position of the window covering. CCS 110 and/or the motor controller may additionally be configured with a real time clock to facilitate real time synchronization and control of environmental and manual override information.

CCS 110 is also equipped with algorithms which enable it to notify the user of optimal positioning for the window covering for function, energy efficiency, light pollution control (depending on the environment and neighbors), cosmetic and/or comfort automatically based on information originating from a variety of sensing device options which can be configured to communicate with the controller using means similar to any of the communication protocols and/or devices (e.g., EnOcean wireless technology) or any others described herein. The automation algorithms within the CCS 110 may be equipped to apply both proactive and reactive routines to facilitate appropriate instructions in the notifications. Proactive and reactive control algorithms are described in greater detail herein.

CCS 110 algorithms may use occupant-initiated override log data to learn what each local zone occupant prefers for his optimal shading. This data tracking may then be used to automatically readjust zone-specific CCS 110 algorithms to adjust one or more sensors 125, motors 130, notification modules 135 and/or other ASCN 100 system components to the needs, preferences, and/or desires of the occupants at a local level. That is, ASCN 100 may be configured to actively track each occupant's adjustments for each occupied zone and actively modify CCS 110 algorithms to automatically adapt to each adjustment for that particular occupied zone. CCS 110 algorithms may include a touch screen survey function. For example, this function may allow a user to select from a menu of reasons prior to overriding a shade position from the touch screen. The function may also record the user's manual adjustment of the window coverings. This data may be saved in a database associated with CCS 110 and used to fine tune ASCN 100 parameters in order to minimize the need for such overrides. Thus, CCS 110 can actively learn how a building's occupants use the shades, and adjust the notifications to these shade uses. In this manner, CCS 110 may fine-tune, refine, and/or otherwise modify one or more proactive and/or reactive algorithms responsive to historical data.

For example, proactive and reactive control algorithms may be used based on CCS 110 knowledge of how a building's occupants use window coverings. CCS 110 may be configured with one or more proactive/reactive control algorithms that proactively input information to/from the manual adjustments and/or motor controllers to facilitate adaptability of ASCN 100. Proactive control algorithms include information such as, for example, the continuously varying solar angles established between the sun and the window opening over each day of the solar day. This solar tracking information may be combined with knowledge about the structure of the building and window opening, as well. This structural knowledge includes, for example, any shadowing features of the building (such as, for example, buildings in the cityscape and topographical conditions that may shadow the sun's ray on the window opening at various times throughout the day/year). Further still, any inclination or declination angles of the window opening (i.e., window, sloped window, and/or skylight), any scheduled positioning of the window covering throughout the day/year, information about the British thermal unit (BTU) load impacting the window at anytime throughout the day/year; the glass characteristics which affect transmission of light and heat through the glass, and/or any other historical knowledge about performance of the window covering in that position from previous days/years may be included in the proactive control algorithms. Proactive algorithms can be setup to notify the user of the optimal positioning of the window covering based on a typical day, worst case bright day or worst case dark day depending on the capabilities and information made available to the reactive control algorithms. These algorithms further can incorporate at least one of the geodesic coordinates of a building; the actual and/or calculated solar position; the actual and/or calculated solar angle; the actual and/or calculated solar penetration angle; the actual and/or calculated solar penetration depth through the window, the actual and/or calculated solar radiation; the actual and/or calculated solar intensity; the time; the solar altitude; the solar azimuth; sunrise and sunset times; the surface orientation of a window; the slope of a window; the window covering stopping positions for a window; and the actual and/or calculated solar heat gain through the window.

Additionally, proactive and/or reactive control algorithms may be used based on measured and/or calculated brightness. For example, CCS 110 may be configured with one or more proactive and/or reactive control algorithms configured to measure and/or calculate the visible brightness on a window. Moreover, the proactive and/or reactive control algorithms may curve fit (e.g. regression analysis) measured radiation and/or solar heat gain in order to generate estimated and/or measured foot-candles on the glazing, foot-candles inside the glass, foot-candles inside the shade and class combination, and the like. Additionally, the proactive and/or reactive control algorithms may utilize lighting information, radiation information, brightness information, reflectance information, solar heat gain, and/or any other appropriate factors to measure and/or calculate a total foot-candle load on a structure.

Further, proactive and/or reactive control algorithms may be used based on measured and/or calculated BTU loads on a window, glass, window covering, and/or the like. CCS 110 may be configured with one or more proactive and/or reactive control algorithms configured to measure and/or calculate the BTU load on a window. Moreover, the proactive and/or reactive control algorithms may take any appropriate action responsive to a measured and/or calculated BTU load, including, for example, generating a movement request to one or more ADIs 105 and/or motors 130. For example, CCS 110 may generate a notification and/or movement request to move a window covering into a first position in response to a measured load of 75 BTUs inside a window. CCS 110 may generate another notification and/or movement request to move a window covering into a second position in response to a measured load of 125 BTUs inside a window. CCS 110 may generate yet another notification and/or movement request to move a window covering into a third position responsive to a measured load of 250 BTUs inside a window, and so on. Additionally, CCS 110 may calculate the position of a window covering based on a measured and/or calculated BTU load on a window. Information regarding measured and/or calculated BTU loads, shade positions, and the like may be viewed on any suitable display device.

In various embodiments, CCS 110 may be configured with predefined BTU loads associated with positions of a window covering. For example, a "fully open" position of a window covering may be associated with a BTU load of 500 BTUs per square meter per hour. A "halfway open" position may be associated with a BTU load of 300 BTUs per square meter per hour. A "fully closed" position may be associated with a BTU load of 100 BTUs per square meter per hour. Any number of predefined BTU loads and/or window covering positions may be utilized or provided in a notification. In this manner, CCS 110 may be configured to provide a notification and/or move one or more window coverings into various predefined positions in order to modify the intensity of the solar penetration and resulting BTU load on a structure.

Reactive control algorithms may be established to refine the proactive algorithms and/or to compensate for areas of the building which may be difficult and/or unduly expensive to model. Reactive control of ASCN 100 may include, for example, using sensors coupled with algorithms which determine the sky conditions, brightness of the external horizontal sky, brightness of the external vertical sky in any/all orientation(s), internal vertical brightness across the whole or a portion of a window, internal vertical brightness measured across the whole or a portion of a window covered by the window covering, internal horizontal brightness of an internal task surface, brightness of a vertical or horizontal internal surface such as the wall, floor or ceiling, comparative brightness between differing internal horizontal and/or vertical surfaces, internal brightness of a PC display monitor, external temperature, internal temperature, manual positioning by the user/occupant near or affected by the window covering setting, overrides of automated window covering position from previous years and/or real time information provided in notifications and/or communicated from other motor controllers affecting adjacent window coverings.

Typical sensors 125 facilitating these reactive control algorithms include radiometers, photometers/photometers, motion sensors, wind sensors, and/or temperature sensors to detect, measure, and communicate information regarding temperature, motion, wind, brightness, radiation, and/or the like, or any combination of the foregoing. For example, motion sensors may be employed in order to track one or more occupants and change reactive control algorithms in certain spaces, such as conference rooms, during periods where people are not present in order to optimize energy efficiency. The disclosure contemplates various types of sensor mounts. For example, types of photometer and temperature sensor mounts include handrail mounts (between the shade and window glass), furniture mounts (e.g., on the room side of the shade), wall or column mounts that look directly out the window from the room side of the shade, and external sensor mounts. For example, for brightness override protection, one or more photometers and/or radiometers may be configured to look through a specific portion of a window wall (e.g., the part of the window wall whose view gets covered by the window covering at some point during the movement of the window covering). If the brightness on the window wall portion is greater than a pre-determined ratio, the brightness override protection may be activated. The pre-determined ratio may be established from the brightness of the PC/VDU or actual measured brightness of a task surface. Each photometer may be controlled, for example, by closed and/or open loop algorithms that include measurements from one or more fields-of-view of the sensors. For example, each photometer may look at a different part of the window wall and/or window covering. The information from these photometers may be used to anticipate changes in brightness as the window covering travels across a window, indirectly measure the brightness coming through a portion of the window wall by looking at the brightness reflecting off an interior surface, measure brightness detected on the incident side of the window covering and/or to measure the brightness detected for any other field of view. The brightness control algorithms and/or other algorithms may also be configured to take into account whether any of the sensors are obstructed (for example, by a computer monitor, etc.). ASCN 100 may also employ other sensors; for example, one or more motion sensors may be configured to employ stricter comfort control routines when the building spaces are occupied. That is, if a room's motion sensors detect a large number of people inside a room, ASCN 100 may provide a notification and/or facilitate movement of the window coverings to provide greater shading and cooling of the room.

Moreover, ASCN 100 may be configured to track radiation (e.g. solar rays and the like) on all glazing of a building including, for example, windows, skylights, and the like. For example, ASCN 100 may track the angle of incidence of radiation; profile solar radiation and solar surface angles; measure the wavelength of radiation; track solar penetration based on the geometry of a window, skylight, or other opening; track solar heat gain and intensity for some or all windows in a building; track shadow information; track reflectance information; and track radiation for some or all orientations, i.e., 360 degrees around a building. ASCN 100 may track radiation, log radiation information, and/or perform any other related operations or analysis in real time. Additionally, ASCN 100 may utilize one or more of tracking information, sensor inputs, data logs, reactive algorithms, proactive algorithms, and the like to perform a microclimate analysis for a particular enclosed space.

In various embodiments, a default operation of the motor controller in "Automatic Mode" may be governed by proactive control algorithms. When a notification, manual adjustment and/or reactive control algorithm interrupts operation of a proactive algorithm, the motor controller can be set up with specific conditions which determine how and when the motor controller can return to Automatic Mode. For example, this return to Automatic Mode may be based upon a configurable predetermined time, for example 12:00 A.M. In another embodiment, ASCN 100 may return to Automatic Mode at a predetermined time interval (such as an hour later), when a predetermined condition has been reached (for example, when the brightness returns below a certain level through certain sensors), when the brightness detected is a configurable percentage less than the brightness detected when the motor was placed into brightness override, if the proactive algorithms require the window covering to further cover the shade, when fuzzy logic routines weigh the probability that the motor can move back into automatic mode (based on information regarding actual brightness measurements internally, actual brightness measurements externally, the profile angle of the sun, shadow conditions from adjacent buildings or structures on the given building based on the solar altitude and/or azimuth, reflectance conditions from external buildings or environmental conditions, and/or the like, or any combination of the same), and/or at any other manual and/or predetermined condition or control.

In various embodiments, motors 130 may be configured to control the movement of one or more window coverings. The window coverings are described in greater detail below. As used herein, motors 130 can include one or more motors and motor controllers. Motors 130 may comprise AC and/or DC motors and may be mounted within or in proximity with a window covering which is affixed by a window using mechanical brackets attaching to the building structure such that motors 130 enable the window covering to cover or reveal a portion of the window or glazing. As used herein, the term glazing refers to a glaze, glasswork, window, and/or the like. Motors 130 may be configured as any type of motor configured to open, close and/or move the window coverings at select, random, predetermined, increasing, decreasing, algorithmic and/or any other increments. For example, in one embodiment, motors 130 may be configured to move the window coverings in ¹⁄₁₆-inch increments in order to graduate the shade movements such that the operation of the shade is almost imperceptible to the occupant to minimize distraction. In another embodiment, motors 130 may be configured to move the window coverings in ⅛-inch increments. Motors 130 may also be configured to have each step and/or increment last a certain amount of time. Moreover, motors 130 may follow pre-set positions on an encoded motor. The time and/or settings of the increments may be any range of time and/or setting, for example, less than one second, one or more seconds, and/or multiple minutes, and/or a combination of settings programmed into the motor encoded, and/or the like. In one embodiment, each ⅛-inch increment of motors 130 may last five seconds. Motors 130 may be configured to move the window coverings at a virtually imperceptible rate to a structure's inhabitants. For example, ASCN 100 may be configured to continually iterate motors 130 down the window wall in finite increments thus establishing thousands of intermediate stopping positions across a window pane. The increments may be consistent in span and time or may vary in span and/or time across the day and from day to day in order to optimize the comfort requirements of the space and further minimize abrupt window covering positioning transitions which may draw unnecessary attention from the occupants.

Motors 130 may vary between, for example, top-down, bottom-up, and even a dual motors 130 design known as fabric tensioning system (FTS) or motor/spring-roller combination. A bottom-up, sloping, angled, and/or horizontal design(s) may be configured to promote daylighting environments where light level through the top portion of the glass may be reflected or even sky-domed deep into the space. Bottom-up window coverings naturally lend their application towards East facing facades where starting from sunrise the shade gradually moves up with the sun's rising altitude up to solar noon. Top-down designs may be configured to promote views whereby the penetration of the sun may be cutoff leaving a view through the lower portion of the glass. Top-down window coverings naturally lend their application towards the West facing facades where starting from solar noon the altitude of the sun drops the shade through sunset. Moreover, angled and/or sloping shading may be used to complement horizontal, angular and/or sloping windows in the façade. Notifications can provide users with instructions on how to manually move such different types of window coverings.

ADI 105 may be configured with one or more electrical components configured to receive information from sensors 125 and/or to transmit information to CCS 110 and/or notification module 135. In one embodiment, ADI 105 may be configured to receive millivolt signals from sensors 125. ADI 105 may additionally be configured to convert the signals from sensors 125 into digital information and/or to transmit the digital information to CCS 110.

ASCN 100 may comprise one or more sensors 125 such as, for example, radiometers, photometers, ultraviolet sensors, infrared sensors, temperature sensors, motion sensors, wind sensors, and the like, in communication with ADI 105. In one embodiment, the more sensors 125 used in ASCN 100, the more error protection (or reduction) for the system. "Radiometers" as used herein, may include traditional radiometers as well as other photo sensors configured to measure various segments of the solar spectrum, visible light spectrum photo sensors, infrared sensors, ultraviolet sensors, and the like. Sensors 125 may be located in any part of a structure. For example, sensors 125 may be located on the roof of a building, outside a window, inside a window, on a work surface, on an interior and/or exterior wall, and/or any other part of a structure. In one embodiment, sensors 125 are located in clear, unobstructed areas. Sensors 125 may be connected to ADI 105 in any manner through communication links 120. In one embodiment, sensors 125 may be connected to ADI 105 by low voltage wiring. In another embodiment, sensors 125 may be wirelessly connected to ADI 105.

Sensors 125 may additionally be configured to initialize and/or synchronize upon starting ASCN 100. For example, various sensors 125, such as radiometers, may be configured to be initially set to zero, which may correspond to a cloudy sky condition regardless of the actual sky condition. Various sensors 125 may then be configured to detect sunlight for a user-defined amount of time, for example three minutes, in order to facilitate building a data file for the sensors. After the user-defined time has lapsed, sensors 125 may be synchronized with this new data file.

As discussed herein, communication links 120 may be configured as any type of communication links such as, for example, digital links, analog links, wireless links, optical links, radio frequency links, TCP/IP links, Bluetooth links, wire links, and the like, and/or any combination of the above. Communication links 120 may be long-range and/or short-range, and accordingly may enable remote and/or off-site communication. Moreover, communication links 120 may enable communication over any suitable distance and/or via any suitable communication medium. For example, in one embodiment, communication link 120 may be configured as an RS422 serial communication link.

ASCN 100 may additionally be configured with one or more databases. Any databases discussed herein may be any type of database, such as relational, hierarchical, graphical, object-oriented, and/or other database configurations. Common database products that may be used to implement the databases include DB2 by IBM (White Plains, New York), various database products available from Oracle Corporation (Redwood Shores, California), Microsoft Access or Microsoft SQL Server by Microsoft Corporation (Redmond, Washington), Base3 by Base3 systems, Paradox or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED).

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on installation, initialization, user or the like. Furthermore, the security information may restrict/permit only certain actions such as accessing, modifying, and/or deleting data sets. In one example, the data set annotation indicates that only the data set owner or the user are permitted to delete a data set, various identified employees are permitted to access the data set for reading, and others are altogether excluded from accessing the data set. However, other access restriction parameters may also be used allowing various other employees to access a data set with various permission levels as appropriate.

One skilled in the art will also appreciate that, for security reasons, any databases, systems, devices, servers or other components may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications (e.g., communication link 120), inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.45.6.78). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, "IT Web Services: A Roadmap for the Enterprise," (2003), hereby incorporated herein by reference.

One or more computerized systems and/or users may facilitate control of ASCN 100. As used herein, a user may include an employer, an employee, a structure inhabitant, a building administrator, a computer, a software program, facilities maintenance personnel, and/or any other user and/or system. In one embodiment, a user connected to a LAN may access ASCN 100 to facilitate movement of one or more window coverings. In another embodiment, ASCN 100 may be configured to work with one or more third-party shade control systems, such as, for example, Draper's IntelliFlex© Control System. In addition and/or in an alternative embodiment, a Building Management System (BMS), a lighting system and/or an HVAC System may be configured to control and/or communicate with ASCN 100 to facilitate optimum interior lighting and climate control. Further, ASCN 100 may be configured to be remotely controlled and/or controllable by, for example, a service center. ASCN 100 may be configured for both automated positioning of the window coverings and a manual override capability, either through a programmable user interface such as a computer or through a control user interface such as a switch. Additionally, ASCN 100 may be configured to receive updated software and/or firmware programming via a remote communication link, such as communication link 120. ASCN 100 may also be configured to transmit and/or receive information directed to operational reporting, system management reporting, troubleshooting, diagnostics, error reporting and the like via a remote communication link. Further, ASCN 100 may be configured to transmit information generated by one or more sensors, such as motion sensors, wind sensors, radiometers, photometers, temperature sensors, and the like, to a remote location via a remote communication link. Moreover, ASCN 100 may be configured to transmit and/or receive any appropriate information via a remote communication link.

In one embodiment, an adaptive/proactive mode may be included. The adaptive/proactive mode may be configured to operate upon first installation for preset duration, whereby manual overrides of the automated settings may be logged and/or critical parameters identified which update the automated routines as to when a specific zone of shades should be deployed to a specific position. Averaging algorithms may be employed to minimize overcompensation. The manual override may be accomplished via a number of methodologies based on how accessible the capability is made to the occupant. In one embodiment, a manager or supervisor may be in charge of manually overriding the shade settings in order to mitigate issues where there may be a variance in comfort settings between individuals. However, override capability may be provided, for example, through switches, a telephone interface, a browser facility on the workstation, a PDA, touch screen, switch and/or by using a remote control. In open plan areas where multibanded shades are employed, an infrared control may be employed so that the user points directly at the shadeband which needs to be operated. Thus, an infrared sensor may be applied by each band of a multibanded shade especially if the sensor is somewhat concealed. ASCN 100 may additionally be configured with a preset timer wherein automatic operation of the window coverings will resume after a preset period after manual override of the system.

In another embodiment, ASCN 100 is configured to provide notifications and/or facilitate control of one or more motor zones, shade bands and/or shade zone. Each motor zone may comprise one motor 130 for one to six shade bands. The shade zones include one or more motor zones and/or floor/elevation zones. For example, in a building that is twelve stories high, each tenant may have six floors. Each floor may comprise one shade zone, containing 3 motor zones. Each motor zone, in turn, may comprise 3 shade bands. A tenant on floors three and four may access ASCN 100 to directly control at least one of the shade zones, motor zones and/or shade bands of its floors, without compromising or affecting the shade control of the other tenants.

In another embodiment, ASCN 100 is configured with a "Shadow Program," to adapt to shadows caused by nearby buildings and/or environmental components, for example hills, mountains, and the like. For example, the shadow program uses a computer model of adjacent buildings and topography to model and characterize the shadows caused by surrounding nearby buildings on different parts of the object building. That is, ASCN 100 may use the shadow program to provide a notification to raise the shades for all motor zones and/or shade zones that are in shadow from an adjacent building, from trees and mountains, from other physical conditions in addition to buildings, and/or from any other obstruction of any kind. This further facilitates maximization of daylight for the time the specific motor zones and/or shade zones are in shadow. When the shadow moves to other motor and/or shade zones (as the sun moves), ASCN 100 may revert to the normal operating program protocols and override the shadow program. Thus ASCN 100 can maximize natural interior daylighting and help reduce artificial interior lighting needs.

In another embodiment, ASCN 100 is configured with a "Reflectance Program," to adapt to light reflected by reflective surfaces. As used herein, reflectance may be considered to be beamed luminance and/or illumination from a specular surface. Light may be reflected onto a building by a body of water, an expanse of snow, an expanse of sand, a glass surface of a building, a metal surface of a building, and the like. For example, the reflectance program uses a computer model of adjacent buildings and topography to model and characterize the light reflected by reflective surfaces onto different parts of the object building. That is, ASCN 100 may use the reflectance program to provide a notification to move (lower and/or raise) one or more window coverings 255, for example a window covering 255 in a motor zone and/or shade zones that are in reflected light from any reflected light surface and/or reflected light source of any kind. In this manner, undesirable glare may be reduced. Moreover, certain types of reflected beamed and/or diffuse illumination may also provide additional daylighting, particularly when the light is directed toward a ceiling. When the reflected light moves to other motor and/or shade zones (e.g., as the sun moves), ASCN 100 may revert to the normal operating program protocols and/or override the reflectance program. Thus, ASCN 100 can maximize natural interior daylighting, help reduce artificial interior lighting needs, and/or reduce glare and other lighting conditions.

In a reflectance program, reflective objects may be defined by the computer as individual objects in a three-dimensional model. Moreover, each reflective object may have multiple reflective surfaces. Each reflective object may be partially or fully, enabled or disabled (i.e., partially or fully included in reflectance calculations or omitted from reflectance calculations). In this manner, if a particular reflective object (or any portion thereof) turns out, for example, to be less reflective than anticipated and/or insufficiently reflective to be of concern at a particular brightness threshold, then that particular reflective object may be fully or partially removed from reflectance calculations without affecting reflectance calculations for other reflective objects. Moreover, a reflectance program utilized by ASCN 100 may be activated or inactivated, as desired. For example, the reflectance program may be configured to be activated if external conditions are considered to be sunny, and the reflectance program may be configured to be inactive if external conditions are considered to be overcast and/or cloudy.

Moreover, a reflectance program utilized by ASCN 100 may be configured with information regarding the nature of each reflective object (e.g., dimensions, surface characteristics, compositions of materials, etc). In this manner, ASCN 100 may respond appropriately to various types of reflected light. For example, in the case of a reflection from a building, the resulting apparent position of the sun has a positive altitude. Therefore, the reflected solar ray is coming downward onto the building in question, just as a direct solar ray is always coming down. Thus, in response, ASCN 100 may utilize one or more solar penetration algorithms in order to provide a notification to move a window covering incrementally downward to at least partially block the incoming reflected solar ray. In another example, in the case of reflectance from a body of water such as a pond, the resulting apparent position of the sun has a negative altitude (e.g., the reflected light appears to originate from a sun shining up from below the horizon). In response, ASCN 100 may provide a notification to move a window covering to a fully closed position to at least partially block the incoming reflected ray. However, ASCN 100 may take any desired action and/or may move a window covering to any suitable location and/or into any appropriate configuration responsive to reflectance information, and ASCN 100 is not limited to the examples given.

In certain embodiments, ASCN 100 may be configured with a minimum calculated reflectance duration threshold before responding to calculated reflectance information generated by a reflectance program. For example, a particular calculated portion of reflected light may be cast onto a particular surface only for a limited amount of time, for example one minute. Thus, movement of a window covering responsive to this reflected light may be unnecessary. Moreover, a notification to move the window covering may not be able to be completed before the reflected light has ceased. Thus, in an embodiment, ASCN 100 is configured to respond to calculated reflectance information only if the calculated reflected light will continuously impinge on a window for one (1) minute or longer. In another embodiment, ASCN 100 is configured to respond to calculated reflectance information only if the calculated reflected light will continuously impinge upon a window for five (5) minutes or longer. Moreover, ASCN 100 may be configured to respond to calculated reflectance information wherein the calculated reflected light will continuously impinge upon a window for any desired length of time.

Additionally, ASCN 100 may be configured with various reflectance response times, for example advance and/or delay periods, associated with calculated reflectance information. For example, ASCN 100 may be configured to provide a notification to move a window covering before a calculated reflected light ray will impinge on a window, for example one (1) minute before a calculated reflected light ray will impinge on the window. ASCN 100 may also be configured to provide a notification to move a window covering after a calculated reflected light ray has impinged on a window, for example ten (10) seconds after a calculated reflected light ray has impinged on a window. Moreover, ASCN 100 may be configured with any appropriate advance and/or delay periods responsive to calculated reflectance information, as desired. Additionally, the advance and/or delay periods may vary from zone to zone. Thus, ASCN 100 may have a first reflectance response time associated with a first zone, a second reflectance response time associated with a second zone, and so on, and the reflectance response times associated with each zone may differ. Additionally, a user may update the reflectance response time associated with a particular zone, as desired. ASCN 100 may thus be configured with any number of zone reflectance response times, default reflectance response times, user-input reflectance response times, and the like.

In various embodiments, a reflectance program utilized by ASCN 100 may be configured to model primary reflectance information and/or higher order reflectance information, e.g., information regarding dispersion reflections. The reflection of light off a non-ideal surface will generate a primary reflection (a first order reflection) and higher order dispersion reflections. In general, second order dispersion reflections and/or higher order dispersion reflections may be modeled provided that sufficient information regarding the associated reflective surface is available (for example, information regarding material characteristics, surface conditions, and/or the like). Information regarding primary reflections from a reflective surface, as well as information regarding higher order reflections from the reflective surface, may be stored in a database associated with the reflectance program. This stored information may be utilized by the reflectance program to calculate the appearance of various reflected light rays. However, due to various factors (for example, absorption at the reflective surface, absorption and/or scattering due to suspended particles in the air, and/or the like) the calculated reflected light rays may in fact be unobtrusive or even undetectable to a human observer where the calculated reflected light is calculated to fall. Thus, no change in a position of a window covering may be needed to maintain visual comfort. ASCN 100 may therefore ignore a calculated reflected light ray in order to avoid "ghosting"—i.e., movement of window coverings for no apparent reason to a human observer.

In general, a ray of light may be reflected any number of times (e.g., once, twice, three times, and so on). A reflectance program may therefore model repeated reflections in order to account for reflected light on a particular target surface. For example, sunlight may fall on a first building with a reflective surface. The light directly reflected off this first building has been reflected one time; thus, this light may be considered once reflected light. The once reflected light may travel across the street and contact a second reflective building. After being reflected from the second building, the once reflected light becomes twice reflected light. The twice reflected light may be further reflected to become thrice reflected light, and so on. Because modeling multiple reflection interactions for a particular light ray results in increased computational load, larger data sets, and other data, a reflectance program may be configured to model a predetermined maximum number of reflections for a particular light ray in order to achieve a desired degree of accuracy regarding reflected light within a desired computation time. For example, in various embodiments, a reflectance program may model only once reflected light (e.g., direct reflections only). In other embodiments, a reflectance program may model once and twice reflected light. Moreover, a reflectance program may model reflected light which has been reflected off any number of reflective surfaces, as desired.

Additionally, because surfaces are typically not perfectly reflective, reflected light is less intense than direct light. Thus, the intensity of light decreases each time it is reflected. Therefore, a reflectance program utilized by ASCN 100 may limit the maximum number of calculated reflections for a particular light ray in order to generate calculated reflectance information. For example, a thrice reflected light ray may be calculated to fall on a target window. However, due to absorption caused by the various intermediate reflective surfaces, the intensity of the thrice reflected light ray may be very low, and may in fact be unobtrusive or even undetectable to a human observer. Thus, no change in a position of a window covering may be needed to maintain visual comfort. ASCN 100 may therefore ignore the calculated thrice reflected light ray in order to avoid ghosting. Additionally, ASCN 100 may calculate reflectance information for only a small number of reflections interactions (for example, once reflected light or twice reflected light) in order to avoid ghosting.

In various embodiments, ASCN 100 may utilize one or more data tables, for example a window table, an elevation table, a floor table, a building table, a shadow table, a reflective surface table, and the like. A window table may comprise information associated with one or more windows of a building (e.g., location information, index information, and the like). An elevation table may comprise information associated with one or more elevations of a building (e.g., location information, index information, and the like). A floor table may comprise information associated with floor of a building (e.g., floor number, height from ground, and the like). A building table may comprise information about a building, for example, orientation (e.g., compass direction), 3-D coordinate information, and the like. A shadow table may comprise information associated with one or more objects which may at least partially block sunlight from striking a building, for example, the height of a mountain, the dimensions of an adjacent building, and the like. A reflective surfaces table may comprise information associated with one or more reflective surfaces, for example, 3-D coordinate information, and the like. In this manner, ASCN 100 may calculate desired information, for example, when sunlight may be reflected from one or more reflective surfaces onto one or more locations on a building, when a portion of a building may be in a shadow cast by an adjacent building, and the like.

ASCN 100 solar tracking algorithms may be configured to assess and analyze the position of the glazing (i.e., vertical, horizontal, sloped in any direction) to determine the solar heat gain and solar penetration. ASCN 100 may also use solar tracking algorithms to determine if there are shadows and/or reflections on the glazing, window wall and/or façade from the building's own architectural features. These architectural features include, but are not limited to, windows, skylights, bodies of water, overhangs, fins, louvers, and/or light shelves. Thus, if the building is shaded by, and/or in reflected light from, any of these architectural features, a notification to adjust the window covering may be provided accordingly using ASCN 100 algorithms.

Figure 5:
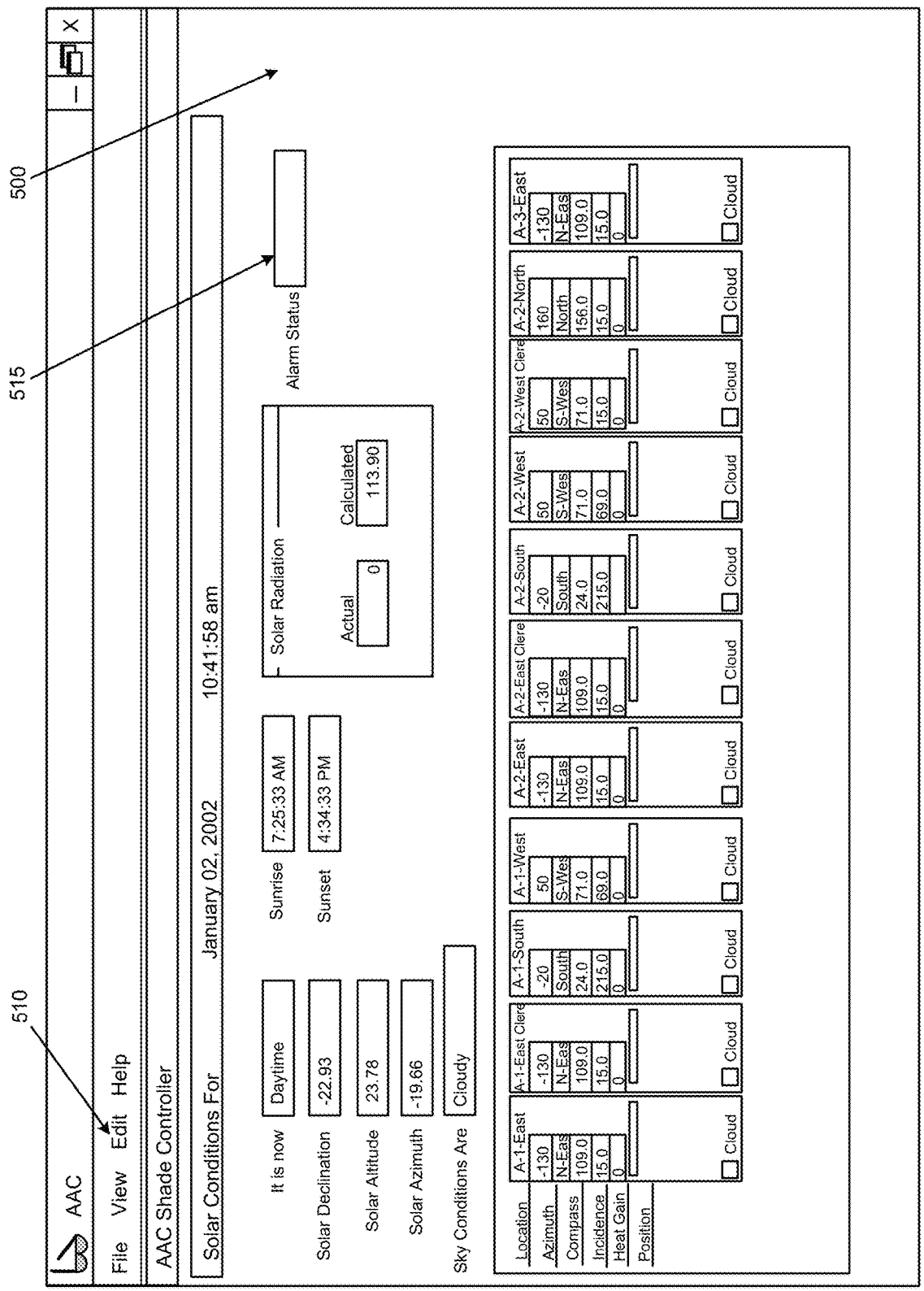
FIG. 5 shows a screen shot of an exemplary user interface (e.g. view of SolarTrac software) in accordance with various embodiments.

ASCN 100 may be configured with one or more user interfaces to facilitate user access and control. For example, as illustrated in an exemplary screen shot of a user interface 500 in FIG. 5, a user interface may include a variety of clickable links, pull down menus 510, fill-in boxes 515, and the like. User interface 500 may be used for accessing and/or defining the wide variety of ASCN 100 information used to provide a notification to control the shading of a building, including, for example, geodesic coordinates of a building; the floor plan of the building; universal shade system commands (e.g., add shades up, down, etc.); event logging; the actual and calculated solar position; the actual and calculated solar angle; the actual and calculated solar radiation; the actual and calculated solar penetration angle and/or depth; the actual and/or calculated solar intensity; the measured brightness and veiling glare across the height of the window wall or a portion of the window (e.g. the vision panel) and/or on any facades, task surfaces and/or floors; shadow information; reflectance information; the current time; solar declination; solar altitude; solar azimuth; sky conditions; sunrise and sunset time; location of the various radiometers zones; the azimuth or surface orientation of each zone; the compass reading of each zone; the brightness at the window zones; the incidence angle of the sun striking the glass in each zone; the window covering positions for each zone; the heat gain; and/or any other parameters used or defined by the ASCN 100 components, the users, the radiometers, the light sensors, the temperature sensors, and the like.

ASCN 100 may also be configured to generate one or more reports based on any of the ASCN 100 parameters as described above. For example, ASCN 100 can generate daylighting reports based on floor plans, power usage, event log data, sensor locations, shade positions, shade movements, shadow information, reflectance information, the relationship of sensor data to shade movements and/or to manual over-rides and/or the like. The reporting feature may also allow users to analyze historical data detail. For example, historical data regarding manual or automated shade movement in conjunction with at least one of sky condition, brightness sensor data, shadow information, reflectance information, and the like, may allow users to continually optimize the system over time. As another example, data for a particular period can be compared from one year to the next, providing an opportunity to optimize the system in ways that have never been possible or practical with existing systems.

ASCN 100 may be configured to operate in automatic mode (based upon preset window covering movements) and/or reactive modes (based upon readings from one or more sensors 125). For example, an array of one or more visible light spectrum photo sensors may be implemented in reactive mode where they are oriented on the roof towards the horizon. The photo sensors may be used to qualify and/or quantify the sky conditions, for example at sunrise and/or sunset. Further, the photo sensors may be configured inside the structure to detect the amount of visible light within a structure. ASCN 100 may further communicate with one or more artificial lighting systems to optimize the visible lighting within a structure based upon the photo sensor readings.

Figure 2A:
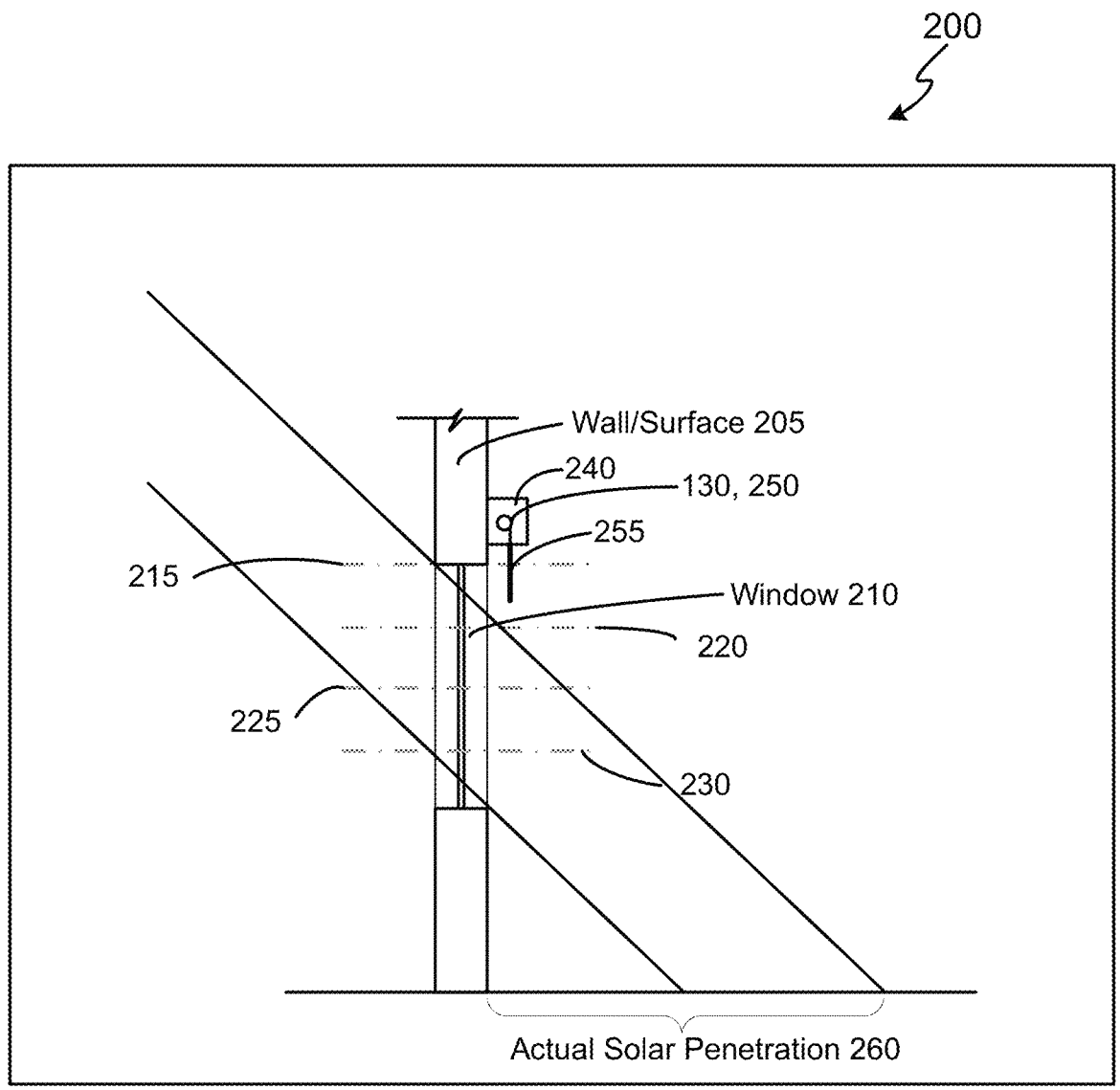
FIG. 2A shows a schematic illustration of an exemplary window system with a window covering retracted in accordance with various embodiments.
Figure 2B:
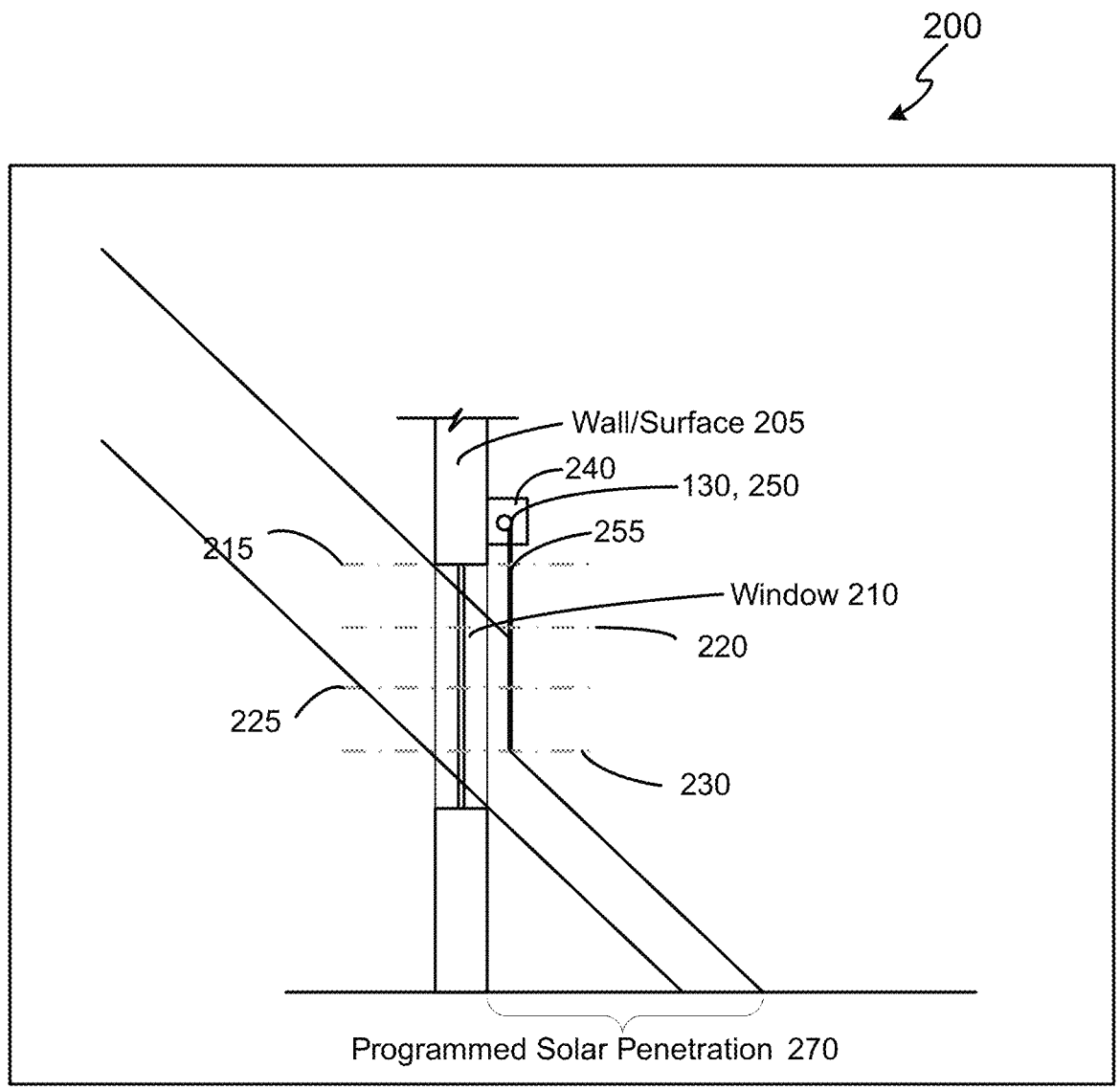
FIG. 2B shows a schematic illustration of an exemplary window system with a window covering extended in accordance with various embodiments.

With reference to an exemplary diagram illustrated in FIG. 2A, an embodiment of a window system 200 is depicted. Window system 200 comprises a structural surface 205 configured with one or more windows 210. A housing 240 may be connected to structural surface 205. Housing 240 may comprise one or more motors 130 and/or opening devices 250 configured for adjusting one or more window coverings 255. Based on factors including, for example, time of day, time of year, window geometry, building geometry, building environment, and the like, a solar ray may achieve an actual solar penetration 260 into an enclosed space through window system 200. With reference now to FIG. 2B, one or more window coverings 255 may be extended in order to partially and/or fully block and/or obstruct the solar ray in order to limit an actual solar penetration to a programmed solar penetration 270.

With continued reference to FIGS. 2A and 2B, structural surface 205 may comprise a wall, a steel reinforcement beam, a ceiling, a floor, and/or any other structural surface or component. Windows 210 may comprise any type of window, including, for example, skylights and/or any other type of openings configured for sunlight penetration. Housing 240 may be configured as any type of housing, including, for example, ceramic pipes, hardware housings, plastic housings, and/or any other type of housing. Opening devices 250 may comprise pull cords, roller bars, drawstrings, ties, pulleys, levers, and/or any other type of device configured to facilitate adjusting, opening, closing, and/or varying window coverings 255.

Window coverings 255 may be any type of covering for a window for facilitating control of solar glare, brightness and veiling glare, contrasting brightness and veiling glare, illuminance ratios, solar heat gain or loss, UV exposure, uniformity of design and/or for providing a better interior environment for the occupants of a structure supporting increased productivity. Window coverings 255 may be any type of covering for a window, such as, for example, blinds, drapes, shades, Venetian blinds, vertical blinds, adjustable louvers or panels, fabric coverings with and/or without low E coatings, mesh, mesh coverings, window slats, metallic coverings and/or the like.

Window coverings 255 may also comprise two or more different fabrics or types of coverings to achieve optimum shading. For example, window coverings 255 may be configured with both fabric and window slats. Furthermore, various embodiments may employ a dual window covering system whereby two window coverings 255 of different types are employed to optimize the shading performance under two different modes of operation. For instance, under clear sky conditions a darker fabric color may face the interior of the building (weave permitting a brighter surface to the exterior of the building to reflect incident energy back out of the building) to minimize reflections and glare thus promoting a view to the outside while reducing brightness and veiling glare and thermal load on the space. Alternatively, during cloudy conditions a brighter fabric facing the interior may be deployed to positively reflect interior brightness and veiling glare back into the space thus minimizing gloom to promote productivity.

Window coverings 255 may also be configured to be aesthetically pleasing. For example, window coverings 255 may be adorned with various decorations, colors, textures, logos, pictures, and/or other features to provide aesthetic benefits. In one embodiment, window coverings 255 are configured with aesthetic features on both sides of the coverings. In another embodiment, only one side of coverings 255 are adorned. Window coverings 255 may also be configured with reflective surfaces, light-absorbent surfaces, wind resistance material, rain resistance material, and/or any other type of surface and/or resistance. While FIG. 2 depicts window coverings 255 configured within a structure, window coverings 255 may be configured on the outside of a structure, both inside and outside a structure, between two window panes and/or the like. Notification module 135 may be configured to send a notification with information about adjusting window coverings 255 to one or more positions along window 210 and/or structural surface 205. For example, as depicted in FIGS. 2A and 2B, the notification may suggest moving window coverings 255 into any number of stop positions, such as into four different stop positions 215, 220, 225, and 230.

Moreover, a notification may indicate that window coverings 255 may be moved independently. For example, window coverings 255 associated with a single window and/or set of windows may comprise a series of adjustable fins or louvers. Control of the upper fins may be separate from control of the lower fins. Thus, light from lower fins may be directed at a first angle to protect people and daylighting, while light from upper fins may be directed at a second angle to maximize illumination on the ceiling and into the space behind the fins. In another example, window coverings 255 associated with a single window and/or set of windows may comprise roller screens and/or horizontal blinds associated with a lower portion of a single window and/or set of windows, and a series of adjustable fins or louvers associated with an upper portion of a single window and/or set of windows. Control of the lower roller screens and/or lower horizontal blinds may be separate from the upper louvers. As before, the lower roller screens and/or lower horizontal blinds may protect people and daylighting, while the upper louvers may direct light toward the ceiling to maximize illumination on the ceiling and into the space behind the louvers.

Further, window coverings 255 may comprise any number of individual components, such as multiple shade tiers. For example, window coverings 255 associated with a single window and/or set of windows may comprise multiple horizontal and/or vertical tiers, for example three shade tiers—a bottom tier, a middle tier, and a top tier. Control of each shade tier may be separate from control of each other shade tier. Thus, for example, notification module 135 may instruct the user to move the top shade tier down, then the middle tier may be moved down, and then the lower tier may be moved down, and vice versa. Moreover, notification module 135 may instruct the user to move multiple shades at the same time. For example, a 300 foot high window may be covered by three 100 foot shades, each of which are adjusted individually. However, the three 100 foot shades may be moved in a concerted manner so as to provide continuous or nearly continuous deployment of shading from top to bottom. Thus, notification module 135 may instruct the user to move multiple shade tiers in any sequence and/or into any configuration suitable to facilitate control of one or more parameters such as, for example, interior brightness, interior temperature, solar heat gain, and the like.

Notification module 135 may provide stop positions 215, 220, 225, and 230 based on the sky type. That is, CCS 110 may be configured to instruct notification module 135 to notify the user to control the movement of the motorized window coverings 255 or a user may choose to manually override the motors of some or all of the coverings 255. Notification module 135 may instruct the user to move window coverings 255 to shade positions 215, 220, 225, and 230 depending on a variety of factors, including, for example, latitude, the time of day, the time of year, the measured solar radiation intensity, the orientation of window 210, the extent of solar penetration 235, shadow information, reflectance information, and/or any other user-defined modifiers. Additionally, notification module 135 may instruct the user to adjust window coverings 255 under a severe weather mode, such as, for example, during hurricanes, tornadoes, and the like. While FIGS. 2A and 2B depict four different stop positions, ASCN 100 may comprise any number of shade and/or stop positions for notifying about shade adjustment.

For example, shading on a building may cause a number of effects, including, for example, reduced heat gain, a variation in the shading coefficient, reduced visible light transmission to as low as 0-1%, lowered "U" value with the reduced conductive heat flow from "hot to cold" (for example, reduced heat flow into the building in summer), and/or reduced heat flow through the glazing in winter. Window coverings 255 may be configured with lower "U" values to facilitate bringing the surface temperature of the inner surface of window coverings 255 closer to the room temperature. That is, to facilitate making the inner surface of window coverings 255 i.e. cooler than the glazing in the summer and warmer than the glazing in the winter. As a result, window coverings 255 may help occupants near the window wall to not sense the warmer surface of the glass and therefore feel more comfortable in the summer and require less air conditioning. Similarly, window coverings 255 may help during the winter months by helping occupants maintain body heat while sitting adjacent to the cooler glass, and thus require lower interior heating temperatures. The net effect is to facilitate a reduction in energy usage inside the building by minimizing room temperature modifications.

Figure 4:
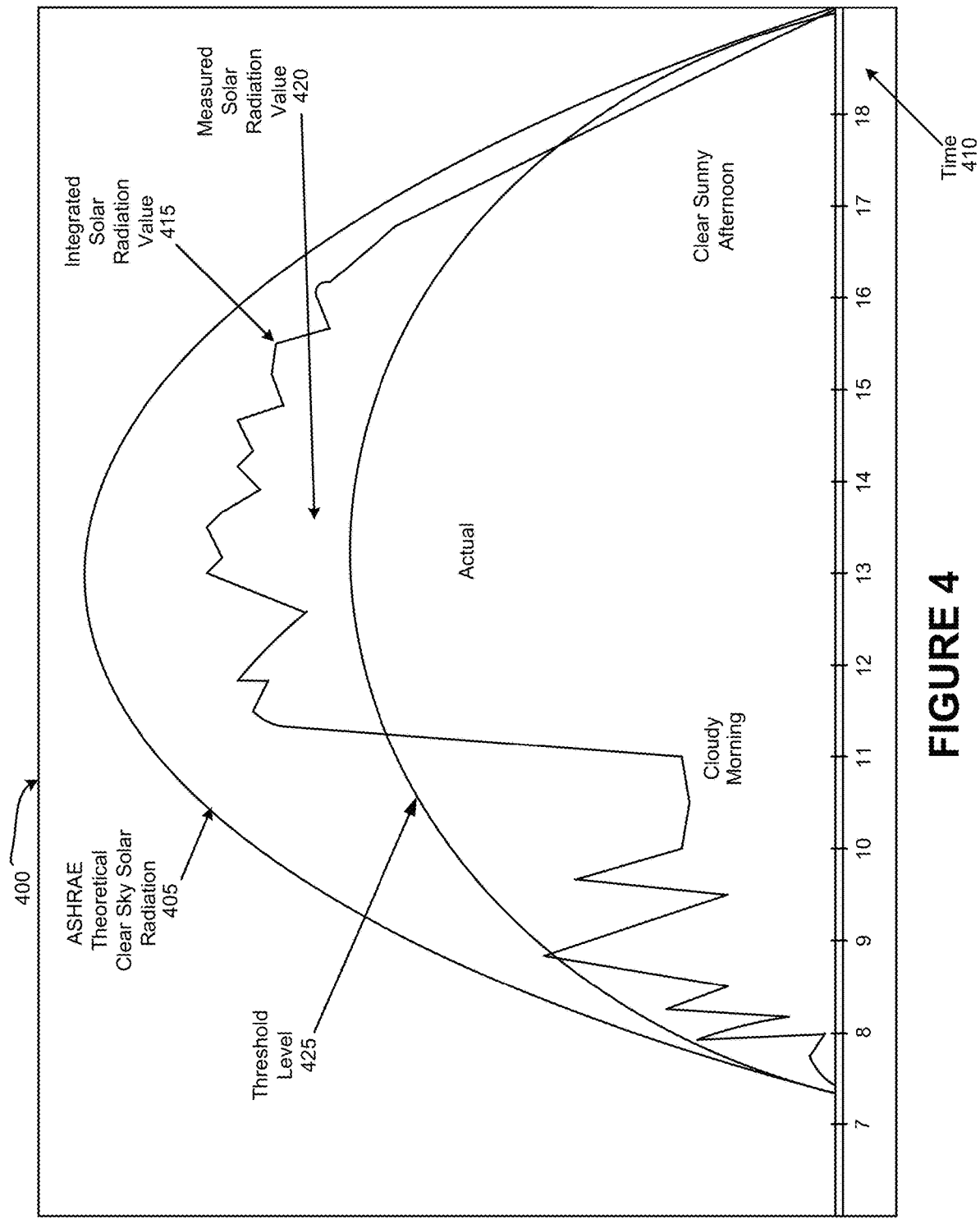
FIG. 4 depicts an exemplary ASHRAE model in accordance with various embodiments.

ASCN 100 may be configured to operate in a variety of sky modes to facilitate movement of window coverings 255 for optimum interior lighting. The sky modes include, for example, overcast mode, night mode, clear sky mode, partly cloudy mode, sunrise mode, sunset mode and/or any other user configured operating mode. ASCN 100 may be configured to use clear sky solar algorithms, for example algorithms developed by the American Society of Heating, Refrigerating and Air-Conditioning Engineers (ASHRAE) and/or any other clear sky solar algorithms known or used to calculate and quantify sky models. For example, and with reference to FIG. 4, the ASHRAE model 400 may include a curve of the ASHRAE theoretical clear sky solar radiation 405 as a function of time 410 and the integrated solar radiation value 415. Time 410 depicts the time from sunrise to sunset. The measured solar radiation values 420 may then be plotted to show the measured values to the calculated clear sky values. ASHRAE model 400 may be used to facilitate tracking sky conditions throughout the day. CCS 110 may be configured to draw a new ASHRAE model 400 every hour, every day, and/or at any other user-defined time interval. Additionally, ASCN 100 may be configured to compare measured solar radiation values 420 to threshold level 425. Threshold level 425 may represent a percentage of ASHRAE calculated clear sky solar radiation 405. When measured solar radiation values 420 exceed threshold level 425, ASCN 100 may be configured to operate in a first sky mode, such as clear sky mode. Similarly, when measured solar radiation values 420 do not exceed threshold level 425, ASCN may be configured to operate in a second sky mode, such as overcast mode.

ASCN 100 may use the ASHRAE clear sky models in conjunction with one or more inputs from one or more sensors 125, such as radiometers, to measure the instantaneous solar radiation levels within a structure and/or to determine the sky mode. CCS 110 may be configured to instruct notification module 135 to instruct the user to adjust the position of window coverings 255 in accordance with the sky mode, the solar heat gain into the structure, the solar penetration into the structure, ambient illumination and/or any other user defined criteria.

For example, in one embodiment, the ASHRAE model can be used to provide a reduced heat gain which is measured by the shading coefficient factor of a fabric which varies by density, weave and color. In addition the window covering, when extended over the glass, may add a "U" Value (reciprocal to "R" value) and reduce conductive heat gain (i.e. reduction in temperature transfer by conduction.)

Figure 3:
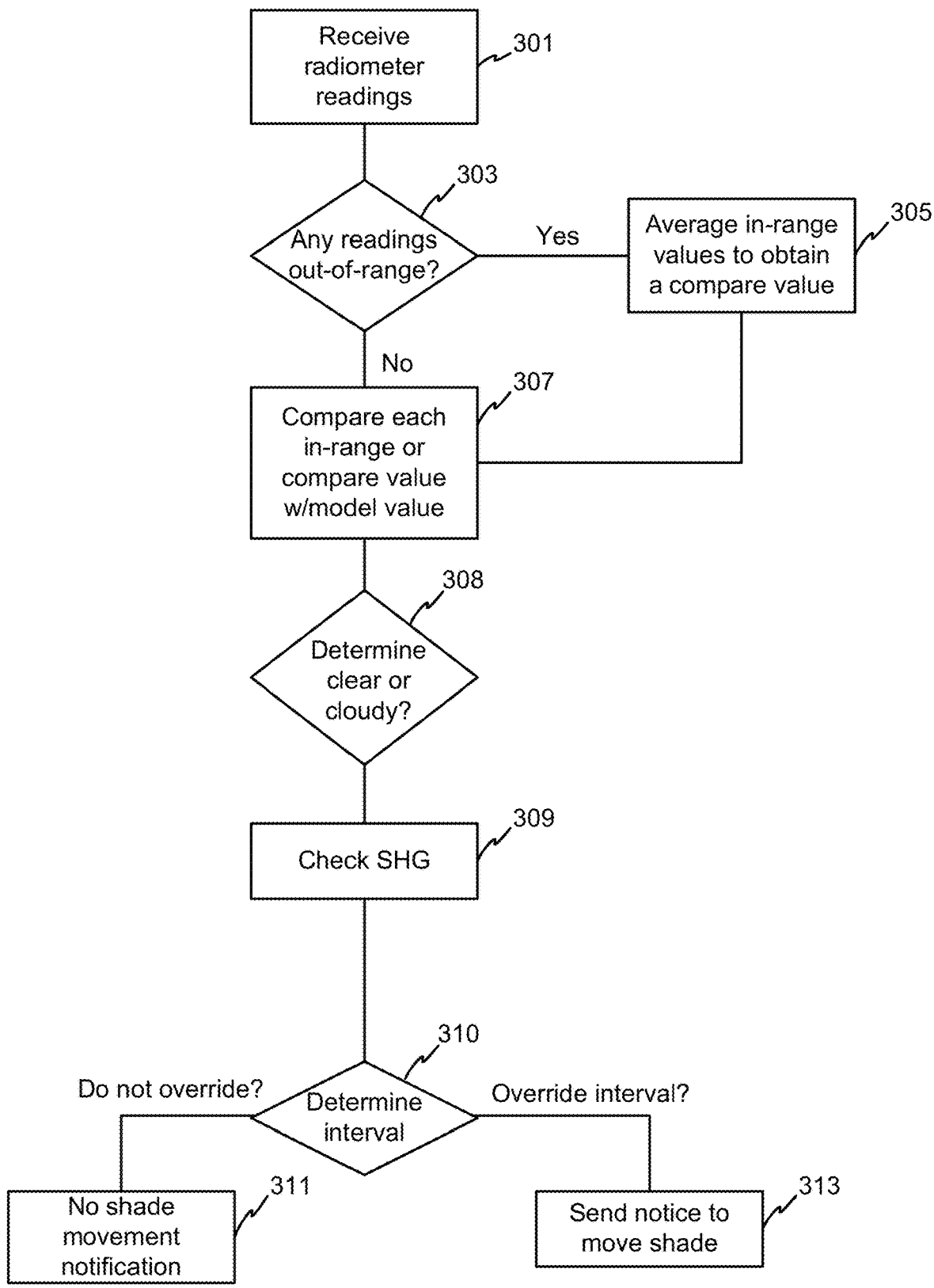
FIG. 3 illustrates a flow diagram of an exemplary method for notification of shade adjustment in accordance with various embodiments.

For example, with reference to a flowchart exemplified in FIG. 3, CCS 110 may be configured to receive solar radiation readings from one or more sensors 125, such as radiometers (step 301). CCS 110 may then determine whether any of the sensor readings are out-of-range, thus indicating an error (step 303). If any of the readings/values are out-of-range, CCS 110 may be configured to average the readings of the in-range sensors to obtain a compare value (step 305) for comparison with an ASHRAE clear sky solar radiation model (step 307). If all readings are in-range, then each sensor value may be compared to a theoretical solar radiation value predicted by the ASHRAE clear sky solar radiation model (step 307). That is, each sensor 125 may have a reading that indicates a definable deviation in percentage from the ASHRAE clear sky theoretical value. Thus, if the sensor readings are all a certain percentage from the theoretical value, it can be determined that the conditions are cloudy or clear (step 308).

CCS 110 may also be configured to calculate and/or incorporate the solar heat gain (SHG) period for one or more zones (step 309). By calculating the SHG, CCS 110 may communicate with one or more sun sensors configured within ASCN 100. The sun sensors may be located on the windows, in the interior space, on the exterior of a structure and/or at any other location to facilitate measuring the solar penetration and/or solar radiation and/or heat gain at that location. CCS 110 may be configured to compare the current position of one or more window coverings 255 to positions based on the most recent calculated SHG to determine whether window coverings 255 should be moved. CCS 110 may additionally determine the time of the last movement of window coverings 255 to determine if another movement is needed. For example, if the user-specified minimum time interval has not yet elapsed, then CCS 110 may be configured to ignore the latest SHG and not provide instructions to move window coverings 255 (step 311). Alternately, CCS 110 may be configured to override the user-defined time interval for window coverings 255 movements. Thus, CCS 110 may facilitate movement of coverings 255 to correspond to the latest SHG value (step 313).

While FIG. 3 depicts the movement of window coverings 255 in a specific manner with specific steps, any number of these steps may be used to facilitate notifications for movement of window coverings 255. Further, while a certain order of steps is presented, any of the steps may occur in any order. Further still, while the method of FIG. 3 anticipates using sensors and/or the SHG and notification module 135 to provide instructions for the movement of window coverings 255, a variety of additional and/or alternative factors may be used by CCS 110 to provide instructions for the movement, such as, for example, the calculated solar radiation intensity incident on each zone, user requirements for light pollutions, structural insulation factors, light uniformity requirements, seasonal requirements, and the like.

For example, ASCN 100 may be configured to employ a variety of iterations for providing instructions for the movement of window coverings 255. In one embodiment, ASCN 100 may be configured to use a Variable Allowable Solar Penetration Program (VASPP), wherein ASCN 100 may be configured to apply different maximum solar penetration settings based on the time of the year. These solar penetrations may be configured to vary some of the operation of ASCN 100 because of the variations in sun angles during the course of a year. For example, in the wintertime (in North America), the sun will be at a lower angle and thus sensors 125, such as radiometers and/or any other sensors used with the present disclosure, may detect maximum BTUs, and there may be high solar penetration into a structure. That is, the brightness and veiling glare on the south and east orientations of the building will have substantial sunshine and brightness on the window wall for the winter months, for extended periods of the day from at least 10 am to 2 pm. Under these situations, the allowable solar penetration setting of ASCN 100 may be set lower to facilitate more protection due to the lower solar angles and higher brightness and veiling glare levels across the façade of the structure. In another embodiment, a shade cloth with a medium to medium dark value grey to the outside and a light medium grey to the interior at 2-3% openness, depending on the interior color may be used to control brightness, maximize view and allow for the more open fabric.

In contrast, in the summertime, the sun will be at a higher angle minimizing BTU load, thus the allowable solar penetration for ASCN 100 may be set higher to facilitate viewing during clear sky conditions. For example, the north, northwest and northeast orientations generally have much lower solar loads year round but do have the orb of the sun in the early morning and the late afternoon in summer, and may have brightness levels that exceed 2000 NITS; 5500 Lux (current window brightness default value) at various times of the year and day however for shorter periods. These high solar intensities are most prevalent during the three month period centered on June 21, the summer solstice. To combat this, ASCN 100 may be configured so that the higher solar penetration does not present a problem with light reaching an uncomfortable position with regard to interior surfaces. Under these conditions, the VASPP may be configured with routine changes in solar penetration throughout the year, for example, by month or by changes in season (i.e., by the seasonal solstices). A minimum BTU load ("go"/"no-go") may additionally be employed in ASCN 100 whereby notifications for suggested movement of window coverings 255 may not commence unless the BTU load on the façade of a structure is above a certain preset level.

The VASPP may also be configured to adjust the solar penetration based on the solar load on the glass. For example, if the south facing elevation has a stairwell, it may have a different solar penetration requirement than the office area and different from the corner at the west elevation. Light may filter up and down the stairwell causing shades to move asymmetrically. As a result, notification module 135 may instruct the user to adjust window coverings 255 based upon the sun angle and solar heat gain levels (which may or may not be confirmed by active sensors before making adjustments). The VASPP may also be configured with an internal brightness and veiling glare sensor to provide information to notification module 135 to instruct the user about fine-tuning of the levels of window coverings 255. Additionally, there may be one or more instruction to the user about pre-adjusted set position points of window coverings 255 based on a day/brightness analysis. The day/brightness analysis may factor in any one or more of, for example, estimated BTU loads, sky conditions, daylight times, veiling glare, averages from light sensors and/or any other relevant algorithms and/or data.

In another aspect, one or more optical photo sensors may be located in the interior, exterior or within a structure. The photo sensors may facilitate daylight/brightness sensing and averaging for reactive protection of excessive brightness and veiling glare due to reflecting surfaces from the surrounding cityscape or urban landscape. These bright reflective surfaces may include but are not limited to, reflective glass on adjacent buildings, water surfaces, sand, snow, and/or any other bright surfaces exterior to the building which under specific solar conditions will send visually debilitating reflective light into the building.

In one exemplary method, the sensors may be located about 30-36 inches from the floor and about 6-inches from the fabric to emulate the field of view (FOV) from a desk top. One or more additional sensors may detect light by looking at the light through window coverings 255 while it moves through the various stop positions. The FOV sensors and the additional sensors may be averaged to determine the daylight levels. If the value of daylight levels is greater than a default value, ASCN 100 may enter a brightness override mode and send information to notification module 135 to instruct the user to adjust window coverings 255 to another position. If the daylight levels do not exceed the default value, ASCN 100 may not enter a brightness override mode and thus not provide instruction to notification module 135 to instruct the user to adjust window coverings 255. Afterwards, ASCN 100 may be configured for providing instructions to notification module 135 to instruct the user to fine-tune the illuminance levels of the window wall by averaging the shaded and unshaded portion of the window. Fine tuning may be used to adjust the field of view from a desk top in accordance with the season, interior, exterior, and furniture considerations and/or task and personal considerations.

In another embodiment, ASCN 100 may be configured with about 6-10 photo sensors positioned in the following exemplary locations: (1) one photo sensor looking at the fabric at about 3 feet 9 inches off the floor and about 3 inches from the fabric at a south elevation; (2) one sensor looking at the glass at about 3 feet 6 inches off the floor and about 3 inches from the glass at a south elevation; (3) one sensor looking at the dry wall at a south elevation; (4) one sensor mounted on a desk-top looking at the ceiling; (5) one sensor mounted outside the structure looking south; (6) one sensor mounted outside the structure looking west; (7) one sensor about 3 inches from the center of the extended window coverings 255 when window coverings 255 is about 25% closed; (8) one sensor about 3 inches from the center of the extended window coverings 255 when coverings 255 is about 25% to 50% closed; (9) one sensor about 3 inches from the center of the glass; and (10) one sensor about 3 inches from the middle of the lower section of a window, approximately 18 inches off the floor. In one embodiment, ASCN 100 may average the readings from, for example, sensors 10 and 7 described above. If the average is above a default value and the ASCN has not moved window coverings 255, notification module 135 may instruct the user to adjust coverings 255 to be moved to an about 25% closed position. Next, ASCN 100 may average the readings from sensors 10 and 8 to determine whether window coverings 255 should be moved again.

In another embodiment, ASCN 100 may be configured to average the reading from sensors 2 and 1 above. ASCN 100 may use the average of these two sensors to determine a "go" or "no go" value. That is, if the glass sensor (sensor 2) senses too much light and ASCN 100 has not moved window coverings 255, coverings 255 will be moved to a first position. ASCN 100 will then average the glass sensor (sensor 2) and the sensor looking only at light through the fabric (sensor 1). If this average value is greater than a user-defined default value, notification module 135 may instruct the user to adjust window coverings 255 to the next position and this process will be repeated. If ASCN 100 has previously dictated a window covering position based upon the solar geometry and sky conditions (as described above), ASCN 100 may be configured to provide information to notification module 135 to instruct the user to override this positioning to lower and/or raise window coverings 255. If the average light levels on the two sensors drop below the default value, the positioning from the solar geometry and sky conditions will be provided to notification module 135 to instruct the user to adjust accordingly.

In another similar embodiment, a series of photo sensors may be employed discreetly behind an available structural member such as a column or staircase whereby, for example, these sensors may be located approximately 3 to 5 feet off the fabric and glass surfaces. Four sensors may be positioned across the height of the window wall corresponding in mounting height between each of potentially five alignment positions (including full up and full down). These sensors may even serve a temporary purpose whereby the levels detected on these sensors may be mapped over a certain time period either to existing ceiling mounted photo sensors already installed to help control the brightness and veiling glare of the lighting system in the space or even to externally mounted photo sensors in order to ultimately minimize the resources required to instrument the entire building.

In various embodiments, ASCN 100 may be configured with one or more additional light sensors that look at a window wall. The sensors may be configured to continuously detect and report the light levels as the shades move down the window. ASCN 100 may use these light levels to compute the luminous value of the entire window walls, and it may use these values to facilitate adjustment of the shades. In one embodiment, three different sensors are positioned to detect light from the window wall. In another embodiment, two different sensors are positioned to detect light from the window wall. A first sensor may be positioned to view the window covering at a position corresponding to window coverings 255 being about 25% closed, and a second sensor may be positioned to view the window at a position of about 75% closed. The sensors may be used to optimize light threshold, differentiate between artificial and natural light, and/or utilize a brightness and veiling glare sensor to protect against overcompensation for brightness and veiling glare. This method may also employ a solar geometry override option. That is, if the light values drop to a default value, the movement of window coverings 255 may be controlled by solar geometric position instead of light levels.

Additionally, ASCN 100 may be configured with one or more sensors looking at a dry interior wall. The sensors may detect interior illuminance and compare this value with the average illuminance of one or more sensors looking at the window wall. This ratio may be used to determine the positioning of window coverings 255 by causing coverings 255 to move up or down in order to achieve an interior lighting ratio of dry wall illuminance to window wall illuminance ranging from about, for example, 9:1 to 15:1. Other industry standard configurations employ illuminance ratios of 3:1 regarding a 30 degree cone of view (central field of vision) around the VDU (Video Display Unit), 10:1 regarding a 90 degree cone of view around the VDU and a ratio of 30:1 regarding back wall illuminance to the VDU. Sensors may be placed strategically throughout the room environment in order to bring data to the controller to support these types of algorithms.

In yet another embodiment, ASCN 100 may also be configured to accommodate transparent window facades following multi-story stair sections which tend to promote a "clerestory-like" condition down a stairway (i.e., the upper portion of a wall that contains windows supplies natural light to a building). ASCN 100 may be configured to use the solar tracking algorithm to consider a double-height façade to ensure that the penetration angle of the sun is properly accounted for and controlled. For example, the geometry of a window (including details such as height, overhangs, fins, position in the window wall, and/or the like) may be programmed into ASCN 100, which then calculates the impact of a solar ray on the window. The photo sensor placement and algorithms may be placed to help detect and overcome any overriding brightness and veiling glare originating from reflections from light penetration through the upper floors.

In another embodiment, ASCN 100 may employ any combination of photo sensors located on the exterior of the building and/or the interior space to detect uncomfortable light levels during sunrise and sunset which override the window covering settings established by the solar tracking under these conditions.

In another embodiment, ASCN 100 may be configured to detect bright overcast days and establish the appropriate window covering settings under these conditions. Bright overcast days tend to have a uniform brightness in the east and west while the zenith tends to be approximately one-third the brightness of the horizons which is contrary to a bright, clear day where the zenith is typically three times brighter than the horizon. Exterior sensors 125, such as photo sensors and/or radiometers, may be configured to detect these conditions. Under these conditions, the window coverings (top-down) may be pulled down to just below the desk height in order to promote proper illumination at the desk surface while providing a view to the cityscape. Internal photo sensors may also be helpful in determining this condition and may allow the window coverings to come down to only 50% and yet preserve the brightness and veiling glare comfort derived by illuminance ratios in the space. For example, various sensors 125, such as photometers and/or radiometers, may be placed on all sides and/or roof surfaces of a building. For example, a rectangular building with a flat roof may have various sensors 125 placed on all four sides of the building and on the roof. Thus, ASCN 110 may detect directional sunlighting on a clear day. Additionally, ASCN 110 may detect a bright overcast condition, wherein sunlighting may have a relatively diffuse, uniform luminous character. Accordingly, ASCN 110 may implement various algorithms in order to control excessive sky brightness and provide notifications to adjust accordingly. Moreover, ASCN 100 may comprise any various sensors 125 placed on all sides and/or facades of a building which has many orientations due to the shape of the building and/or the directions a building façade faces.

In various embodiments, overriding sensors 125 may also be strategically placed on each floor and connected to ASCN 100 to help detect glare reflections from the urban landscape as well as to handle changes made in the urban landscape and ensure the proper setting for the shades to maintain visual comfort. These sensors 125 may also be employed to help reduce veiling glare and brightness problems at night in urban settings where minimal signage thresholds imposed on surrounding buildings and the instrumented building may pose unusual lighting conditions which may be difficult to model. In some cases, these situations may be static whereby a sensor 125 may be unnecessary and a timer may simply be employed to handle these conditions based on occupancy which is information that may be provided from the building's lighting system. Moreover, a reflectance algorithm may be employed by ASCN 100 in order to account for reflected light, including reflected sunlight, reflected artificial light from nearby sources, and the like.

Figure 6:
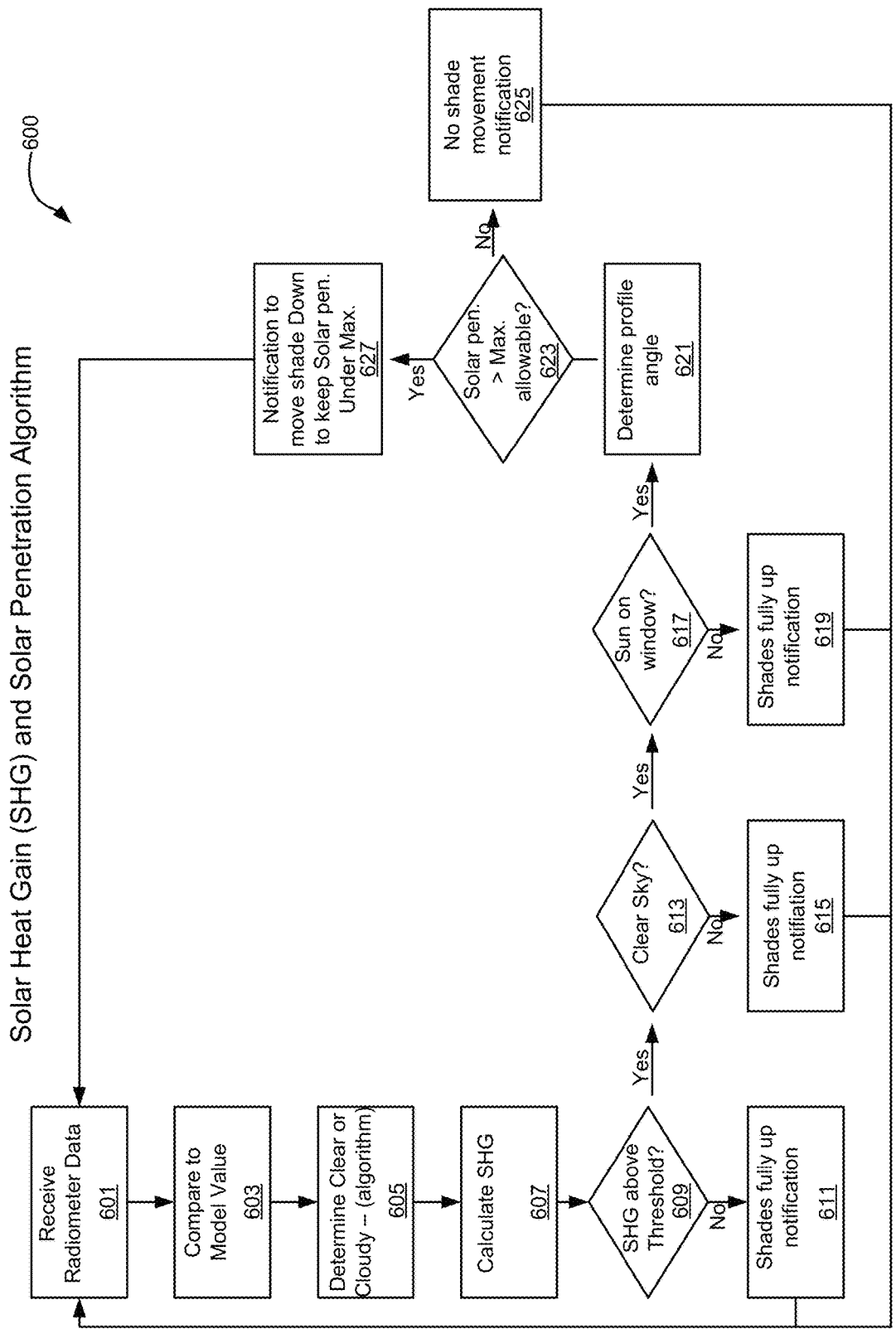
FIG. 6 illustrates a flowchart of exemplary solar heat gain and solar penetration sensing and notification in accordance with various embodiments.

In accordance with various embodiments, and with reference now to FIG. 6, ASCN 100 may be configured to implement an algorithm, such as algorithm 600, incorporating at least one of solar heat gain information, sky condition information, shadow information, reflectance information, solar profile information and/or solar penetration information. CCS 110 may be configured to receive information from one or more sensors 125, such as radiometers or other total solar measuring sensors (step 601). CSS 110 may then compare the received information to one or more model values (step 603). Based on the results of the comparison, CCS 110 may determine if the sky conditions are cloudy or clear (step 605). CCS 110 may then calculate the solar heat gain for the interior space in question (step 607). CCS 110 may then evaluate if the solar heat gain is above a desired threshold (step 609). If the solar heat gain is below a desired threshold, for example, notification module 135 may instruct the user to adjust one or more window coverings at least partially toward to a fully opened position (step 611). Correspondingly, if one or more window coverings are already in a fully opened position, notification module 135 may instruct the user that the window coverings may not be moved.

Continuing to reference FIG. 6, if the solar heat gain is above a desired threshold, CCS 110 may use sky condition information determined in step 605 to evaluate the need to move one or more window coverings (step 613). If the sky conditions are determined to be overcast, one or more window coverings may be moved at least partially toward a fully opened position and/or kept in a fully opened position (step 615). If the sky conditions are determined to be clear, CCS 110 may use at least one of shadow information, reflectance information, and the like, to determine if one or more windows in question are exposed to sunlight (step 617). If the one or more windows in question are not exposed to sunlight, notification module 135 may instruct the user that the one or more window coverings may be moved at least partially toward a fully opened position and/or kept in a fully opened position (step 619). If the one or more windows in question are exposed to sunlight, CCS 110 may calculate and/or measure the profile angle and/or incident angle of the sunlight (step 621).

With continued reference to FIG. 6, based on information including but not limited to solar profile angle, solar incident angle, window geometry, building features, position of one or more window coverings, shadow information, reflectance information, sky conditions and/or the like, CCS 110 may then calculate the current solar penetration. If the current solar penetration is below a threshold solar penetration (step 623), notification module 135 may instruct the user to adjust one or more windows coverings at least partially toward a fully open position and/or kept in a fully opened position (step 625). Alternatively, if the current solar penetration is above a threshold solar penetration, CCS 110 may issue instructions to move one or more window coverings at least partway toward a fully closed position in order to reduce the current solar penetration below the threshold solar penetration (step 627).

Moreover, in certain embodiments, CCS 110 and/or ASCN 100 may be configured with a delay period before responding to information received from a sensor (for example, reflectance information, brightness information, shadow information, and/or the like). For example, certain reflected light, such as light reflected from a moving vehicle, may be cast onto a particular surface only for a limited amount of time. Thus, movement of a window covering responsive to this reflected light may be unnecessary. Moreover, movement of the window covering may not be able to be completed before the reflected light has ceased. Additionally, responding to repeated transient reflected light rays (e.g., reflections from a procession of vehicles, from the unsettled surface of a body of water, and the like) may result in near-constant window covering movement in an attempt to keep up with the ever-changing lighting conditions. In another example, a certain shadow condition may only persist for a brief period of time, for example a shadow condition caused by the sun being momentarily obscured by a cloud. Therefore, notification module 135 may instruct the user that movement of a window covering responsive to this change in lighting may be unnecessary.

Thus, in an embodiment, ASCN 100 and/or CCS 110 is configured to respond to information from a sensor only after the sensor has reported a changed lighting condition (e.g., the appearance of reflected light, the appearance of shadow, and/or the like) persisting for five (5) seconds. In another embodiment, ASCN 100 and/or CCS 110 is configured to respond to information from a sensor only after the sensor has reported a changed lighting condition persisting for ten (10) seconds. Moreover, ASCN 100 may have a first response time associated with a first zone, a second response time associated with a second zone, and so on, and the response times associated with each zone may differ. Additionally, a user may update the response time associated with a particular zone, as desired. ASCN 100 may thus be configured with any number of zone response times, default response times, user-input response times, and the like.

Turning now to FIG. 7A, and in accordance with various embodiments, ASCN 100 may be configured to implement an algorithm, such as algorithm 700, incorporating measured brightness information. CCS 110 may be configured to receive brightness information from one or more photometers. CCS 110 may also be configured to receive information from other sensors, such as radiometers, ultraviolet sensors, infrared sensors, and the like (step 701). CCS 110 may then evaluate the current luminance and/or illuminance, and compare the current luminance and/or illuminance to a threshold luminance and/or illuminance (step 703). If the current value exceeds a threshold value, CCS 110 may implement a brightness override, and notification module 135 may instruct the user to adjust one or more window coverings at least partway toward a fully closed position (step 705). If the current value does not exceed a threshold value, CCS 110 may not implement a brightness override, and notification module 135 may instruct the user that one or more window coverings may be left in their current positions and/or moved at least partway toward a fully open position (step 707).

Moreover, ASCN 100 may be configured to utilize one or more external sensors, for example visible light sensors, in order to implement a brightness override. In this manner, individual building zone brightness sensors may be reduced and/or eliminated, leading to significant cost savings, as the building zone brightness sensors may be costly to purchase and/or install, and difficult to calibrate and/or maintain. Moreover, ASCN 100 may be configured to utilize one or more interior photo sensors in conjunction with one or more external photo sensors in order to determine if a brightness override is needed for any of the motor zones in a particular building.

Figure 7B:
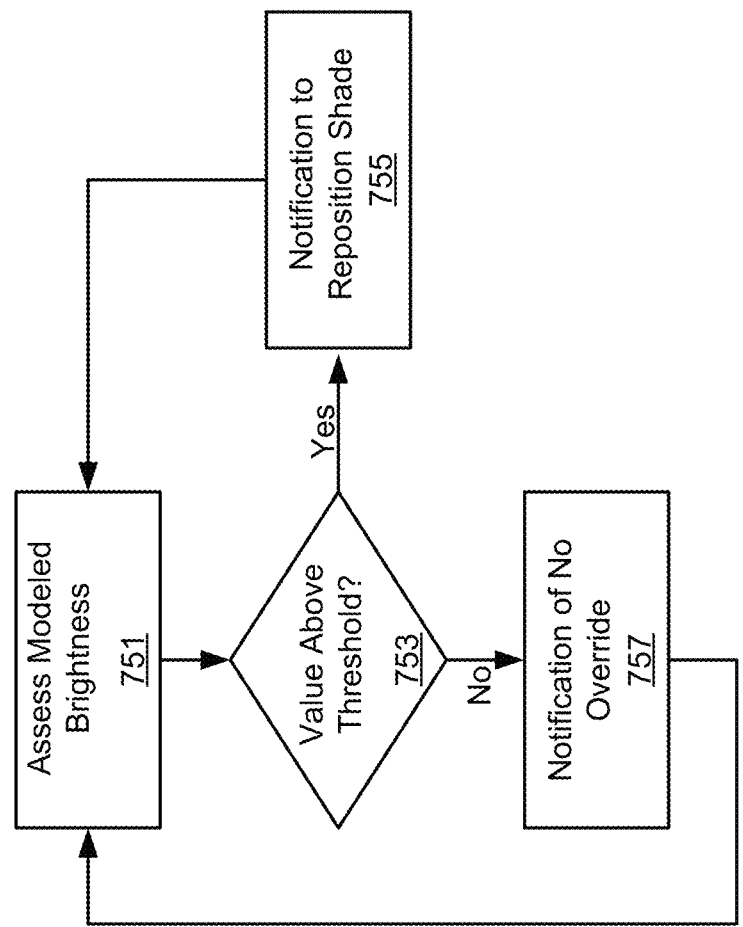
FIG. 7B illustrates a flowchart of exemplary brightness modeling and notification in accordance with various embodiments.

Turning now to FIG. 7B, and in accordance with various embodiments, ASCN 100 may be configured to implement an algorithm, such as algorithm 750, incorporating modeled brightness information. For example, ASCN 100 may be configured to utilize modeled brightness information in order to determine whether to move a shade. In various embodiments, the modeled brightness information is correlated and/or curve-fit to a measured and/or modeled BTU load on a window, a measured and/or modeled total solar radiation level (for example, as predicted by a clear sky model, such as an ASHRAE model), or other variable associated with a window. In various embodiments, a brightness model may be utilized by and/or incorporated into ASCN 100 in order to enable adjustment of shades in incremental, intermediate positions (in addition to fully closed or fully open) to achieve a desired brightness level, for example, a desired brightness level in a room. In connection with a brightness model, ASCN 100 may be configured to instruct notification module 135 to instruct the user to position a particular shade in up to 128 intermediate positions between fully open and fully closed. In this manner, ASCN 100 enables incremental adjustment of the brightness level in a room, rather than just a binary open/closed adjustment. For example, if brightness is X Lux, go to position 1, if brightness is Y Lux, go to position 2, and so forth.

Using modeled brightness information, ASCN 100 may be configured with a reduced and/or eliminated reliance on external photometers and/or radiometers. For example, via use of modeled brightness information, ASCN 100 may be operable at a suitable level of performance in connection with only a single external photometer (for example, a photometer located on the roof of a building) or a small number of external photometers (for example, a photometer associated with each floor of a building), rather than in connection with a photometer associated with each window on a building. In this manner, by eliminating most and/or all external photometers, ASCN 100 may be configured to greatly reduce initial system cost, reduce ongoing maintenance expense, and improve system reliability.

In addition to modeled brightness information, measured brightness information may be utilized by ASCN 100, for example, to calibrate and/or refine a brightness model. In various embodiments, a default brightness model may be utilized by ASCN 100 in connection with a particular building based on latitude, elevation, date and time, and so forth. Based on information obtained over time from one or more radiometers and/or photometers associated with the building, ASCN 100 may refine and/or revise the default brightness model to more closely model actual conditions associated with the building. In this manner, ASCN 100 may improve the accuracy of a brightness model, allowing ongoing operation of ASCN 100 with fewer and/or no photometers while still delivering an acceptable level of performance.

Moreover, measured brightness information utilized to refine, update, modify, or supplement modeled brightness information may be obtained from one or more sensors (e.g., photometers, radiometers, and/or the like). In various embodiments, ASCN 100 is configured with four (4) photometers, one facing each cardinal direction (north, south, east, west). Brightness information from the photometers may be utilized to refine and/or update the brightness model. In various embodiments, ASCN 100 is configured with photometers in the intercardinal directions (northeast, northwest, southwest, southeast). Photometers may vary in azimuth as well as elevation in order to obtain a desired amount of measured brightness information.

In various embodiments, a brightness model is configured to consider multiple factors contributing to the brightness at a location of interest (for example, a window) throughout the day. In various embodiments, a brightness model is configured to include information about direct solar radiation, diffused solar radiation, reflected solar radiation, and field-of-view (i.e., skyline) information for one or more locations of interest In various embodiments, a brightness model may be created by utilizing correlation, curve-fitting, modification factors (i.e. weighting), algorithms, and/or other mathematical relationships to one or more other variables associated with a structure (and/or locations of interest thereon) and/or the environment of a structure. For example, a brightness model may be created and/or refined by utilizing one or more of a clear sky model, measured BTU load information, modeled BTU load information, atmospheric information (altitude, humidity, pollution, and/or the like), measured total radiation, modeled total radiation, window orientation, window elevation, window azimuth, window size, window altitude, skyline information, and/or the like. Moreover, a brightness model may be created and/or modified by utilizing any suitable inputs or variables, as desired.

In various embodiments, field-of-view information may be utilized in a brightness model in order to more accurately predict and/or model how brightness varies at a location of interest and/or among multiple locations of interest (e.g., multiple windows on a building). For example, in a particular building, a first window (having a particular orientation, elevation, and so forth) may have an unobstructed view to the horizon, while a second window (having, again, its own particular orientation, elevation, and so forth) may have a partially obstructed view due to a nearby building, and a third window may have a nearly completely obstructed view due to the nearby building. Because the field-of-view can affect the brightness at a location, a brightness model may incorporate this information for each location of interest (e.g., in order to allow ASCN 100 to control the shades in a desired manner). In this manner, ASCN 100 may implement a modeled brightness override instruction for shades associated with certain windows, while simultaneously not implementing a modeled brightness override instruction for shades associated with certain other windows. Stated differently, ASCN 100 may be configured to implement a modeled brightness override on an "as-needed" basis, and independently with respect to one window and/or motor zone from another.

Additionally, in various embodiments ASCN 100 may be configured with multiple photometers in order to assess the amount of brightness that is due to the sky dome and the amount of brightness that is due to the urban landscape. As discussed in additional detail herein, in various embodiments, a computer model of a building and its surroundings can be used to generate a Pleijel projection image (for example, a "virtual camera" constructs a 180 degree hemispherical projection of all objects visible in the direction the virtual camera is facing). This field of view information can be combined and/or correlated with photometer information and utilized in brightness model. For example, a photometer mounted on a rooftop may be utilized to identify brightness contributions from the sky dome, while a photometer mounted on a window may be utilized to identify brightness contributions from the adjacent urban landscape. The relative weighting of these inputs can be adjusted, for example based on the field of view information.

In various embodiments, field-of-view information may be utilized in a brightness model as an adjustment parameter, for example expressed as a percentage, which may modify the effect of calculated sky brightness for a location of interest. For example, if the view from a particular window includes urban landscape in the bottom ⅔ of the view, and sky in the upper ⅓ of the view, a particular adjustment parameter value may be set, decreasing the effect/contribution of calculated sky brightness as compared to a full sky view at that location of interest in consideration of the urban landscape portion of the field of view. Similarly, if the view from a particular window includes urban landscape in the bottom ⅓ of the view, and sky in the upper ⅔ of the view, a particular adjustment parameter value may be set, decreasing the effect of calculated sky brightness to a lesser degree. It will be appreciated that, in general, the greater the degree to which the urban landscape or other items occlude a view of the sky at a location of interest, the lesser the contribution/impact of calculated sky brightness in a brightness model for that location of interest.

In various embodiments, ASCN 100 is configured to use a measured brightness algorithm simultaneously with a modeled brightness algorithm, for example in order to refine the modeled brightness algorithm, to evaluate potential addition and/or removal of photometers, to evaluate computational loads on the system, and so forth.

In various embodiments, ASCN 100 is configured to use a modeled brightness algorithm that incorporates luminance values. In various other embodiments, ASCN 100 is configured to use a modeled brightness algorithm that incorporates illuminance values. In certain embodiments, ASCN 100 is configured to use a modeled brightness algorithm that incorporates luminance values and illuminance values.

Additionally, in certain embodiments a modeled brightness algorithm may be operative in real time; in other embodiments a modeled brightness algorithm may operate not in real time. Moreover, a modeled brightness algorithm may be configured to use current weather data from local sensors or third-party sources (for example, weather data available from a database or via an electronic network), historical weather data, and so forth.

In various embodiments, ASCN 100 is configured to utilize a brightness model in connection with one or more timers and/or delays. For example, ASCN 100 may be configured to not implement a modeled brightness override notification if one or more windows and/or motor zones will be in an excessive brightness condition for a limited period of time, such as between about one minute and thirty minutes. Moreover, ASCN 100 may be configured to not implement a modeled brightness override notification if one or more windows and/or motor zones will be in an excessive brightness condition for any desired length of time.

"Excessive" brightness may include a condition that causes visual or physical discomfort for an occupant. Moreover, excessive brightness may include a specific brightness value in Lux that is flagged as excessive. For example, if it is a cloudy day and Lux in the room is above a certain value, then the room is too bright. If it is a sunny day and Lux in the room is above another certain value, then the room is too bright.

It will be appreciated that ASCN 100 may be configured to utilize modeled brightness information at a particular location, for example on a vertical plane that is parallel to window glass. In this manner, modeled brightness information may be further accounted for and/or utilized, for example, by considering internal brightness values to be equal to modeled brightness values multiplied by the visible light transmittance of the window glass. Similarly, modeled brightness information may be utilized in connection with information regarding brightness factor of shade material in order to determine overall internal brightness arising from a particular window and shade combination. Additional details regarding brightness factor may be found in U.S. Ser. No. 12/710,054, now U.S. Patent Application Publication No. 2010/0157427 entitled "System and Method for Shade Selection Using a Fabric Brightness Factor", the contents of which is hereby incorporated by reference in its entirety for all purposes.

Continuing to reference FIG. 7B, in an exemplary method, ASCN 100 may be configured to utilize modeled brightness information in connection with implementing a modeled brightness override notification. ASCN 100 may receive, retrieve, or otherwise obtain a modeled brightness value for a location of interest (step 751). ASCN 100 may then evaluate the modeled brightness value, and compare the modeled brightness value to a threshold brightness value (step 753). If the modeled brightness value exceeds a threshold brightness value, ASCN 100 may implement a modeled brightness override notification, and one or more window coverings may be moved at least partway toward a fully closed position (step 755). If the modeled brightness value does not exceed a threshold brightness value, ASCN 100 may not implement a modeled brightness override notification, and one or more window coverings may be left in their current positions and/or moved at least partway toward a fully open position (step 757).

In various embodiments, ASCN 100 may be configured to implement a modeled brightness override notification when ASCN 100 is operating in clear sky mode. In various embodiments, ASCN 100 may be configured to implement a modeled brightness override notification when ASCN 100 observes measured solar radiation equal to or in excess of a threshold value, for example 75 percent of a clear sky model (for example, ASHRAE) calculated clear sky solar radiation, 60 percent of a clear sky model calculated clear sky solar radiation, and/or the like.

In various embodiments, ASCN 100 may be configured to control the position of one or more window coverings based on multiple algorithms. The algorithms may be ranked or otherwise weighted to determine priority. In certain embodiments, ASCN 100 may control the position of one or more window coverings based on algorithms associated with i) solar penetration, ii) solar heat gain, iii) illuminance, iv) luminance, v) sky conditions, and/or combinations of some or all of the foregoing. Depending on user preference, climate conditions, energy expenditure targets, and the like, the priority of a certain algorithm may be raised and/or lowered. Thus, in certain instances an algorithm for controlling one or more window coverings based on solar heat gain may take priority over an algorithm for controlling one or more window coverings based on solar penetration. Likewise, in certain other instances an algorithm for controlling one or more window coverings based on solar penetration may take priority over an algorithm for controlling one or more window coverings based on solar heat gain. Moreover, in yet other instances an algorithm for controlling one or more window coverings based on modeled brightness information may take priority over an algorithm for controlling one or more window coverings based on solar heat gain, and so forth.

Yet further, in various embodiments various control algorithms may be configured to have only partial priority over one another. For example, an algorithm for controlling one or more window coverings based on solar penetration may determine a maximum level to which a window covering can be raised without exceeding a target solar penetration level. Another algorithm, for example an algorithm for controlling one or more window coverings based on modeled brightness information, may determine a different position for a window covering in order to avoid excessive brightness; ASCN 100 may be configured to allow the modeled brightness algorithm to further refine (e.g., lower and raise) the position of the window covering, provided such position does not exceed the maximum allowed position calculated by the solar penetration algorithm. Stated differently, the modeled brightness algorithm may be permitted to raise and lower a window covering, but not beyond the maximum raised level permitted by the solar penetration algorithm. In a similar manner, multiple algorithms may be configured in a hierarchy, or otherwise restrict or partially govern one another, in order to provide a greater level of control over one or more window coverings.

Figure 8:
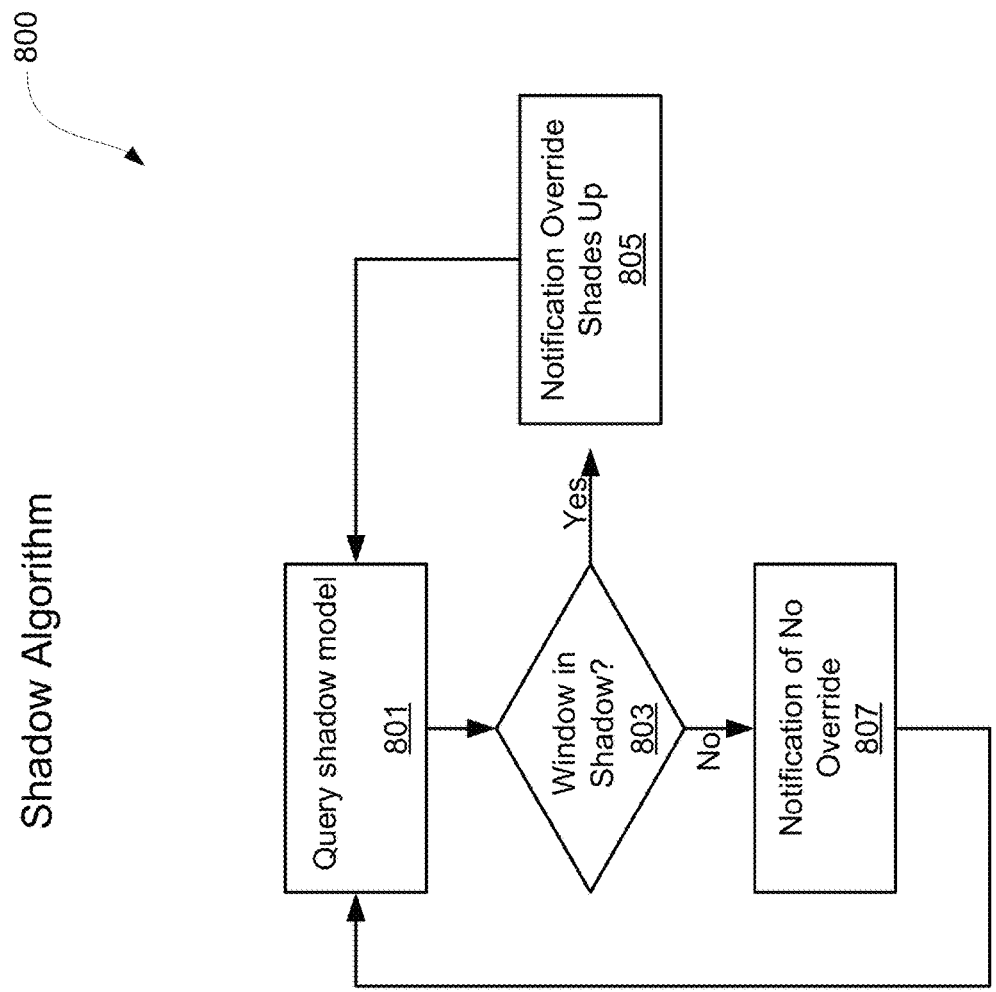
FIG. 8 illustrates a flowchart of exemplary shadow modeling and notification in accordance with various embodiments.

With reference now to FIG. 8, and in accordance with various embodiments, ASCN 100 may be configured to implement an algorithm, such as algorithm 800, incorporating shadow information. CCS 110 may be configured to query a shadow model (step 801) which may contain information regarding shadowing of a building due to the environment, such as nearby structures, landscape features (e.g., mountains, hills, and the like), and other items which may cast a shade onto a building at any point during a day and/or year. CCS 110 may then evaluate the current shadow information to determine if one or more windows and/or motor zones are in a shadowed condition (step 803). If the one or more windows and/or motor zones are shadowed, CCS 110 may implement a shadow override notification, and one or more window coverings may be moved at least partway toward a fully open position (step 805). If one or more windows and/or motor zones are not shadowed, CCS 110 may not implement a shadow override notification, and one or more window coverings may be left in their current positions and/or moved at least partway towards a fully closed position (step 807). Additionally, CCS 110 may be configured to not implement a shadow override notification if one or more windows and/or motor zones will be shadowed for a limited period of time, such as between about one minute and thirty minutes. Moreover, CCS 110 may be configured to not implement a shadow override notification if one or more windows and/or motor zones will be shadowed for any desired length of time.

In various embodiments, CCS 110 may be configured to implement a shadow override notification when ASCN 100 is operating in clear sky mode. In various embodiments, CCS 110 may be configured to implement a shadow override notification when ASCN 100 observes measured solar radiation equal to or in excess of 75 percent of ASHRAE calculated clear sky solar radiation. Moreover, in various embodiments, CCS 110 may be overridden by a bright overcast sky mode calculation wherein one or more window coverings are moved to a predetermined position, for example 50% of fully open.

Figure 9:
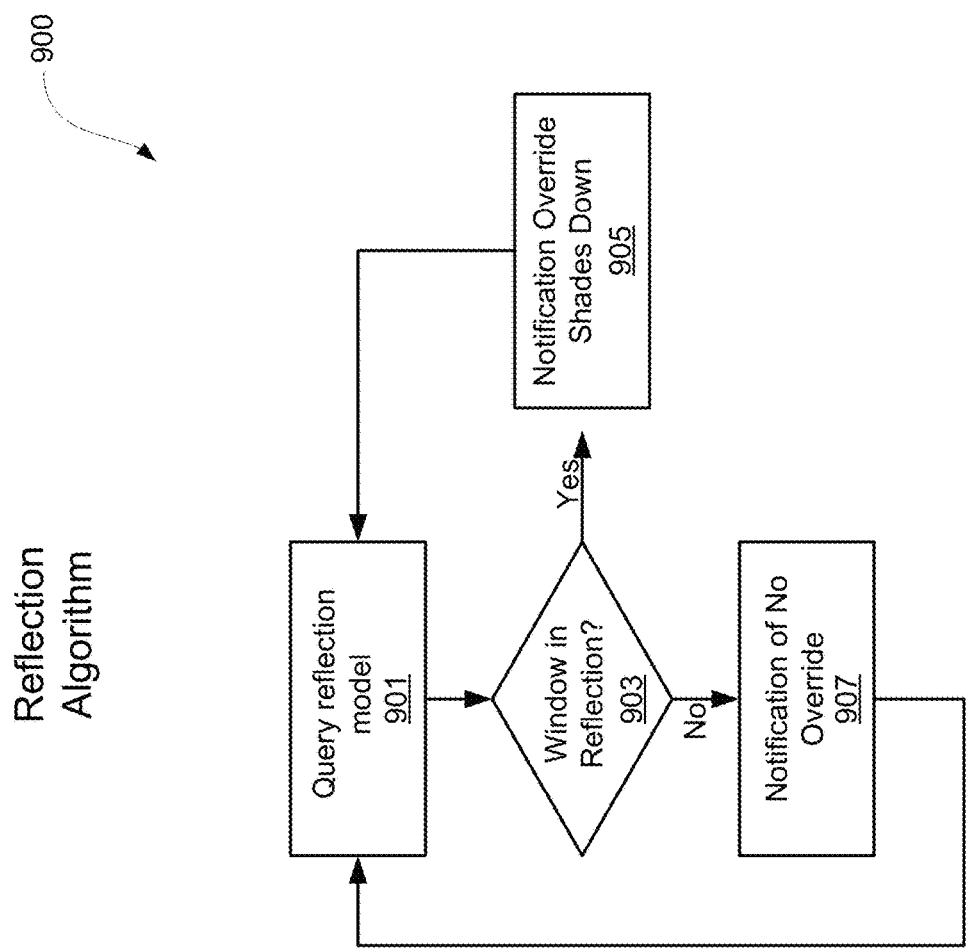
FIG. 9 illustrates a flowchart of exemplary reflectance modeling and notification in accordance with various embodiments.

With reference now to FIG. 9, and in accordance with various embodiments, ASCN 100 may be configured to implement an algorithm (e.g., algorithm 900) incorporating reflectance information. CCS 110 may be configured to query a reflectance model (step 901) which may contain information regarding light reflected onto a building due to the environment, for example by reflective components of nearby structures, landscape features (e.g., water, sand, snow, and the like), and other items which may reflect light onto a building at any point during any time period (e.g., day, season, year). CCS 110 may then evaluate the current reflectance information to determine if one or more windows and/or motor zones are in a reflectance condition (step 903). If reflected light is cast on at least a portion of one or more windows and/or motor zones, the window and/or motor zone may be deemed to be in a reflectance condition. Moreover, if only a subset of the windows comprising a motor zone is in a reflectance condition, that motor zone may be considered to be in a reflectance condition.

However, ASCN 100 may be configured to assess each window in a motor zone and determine if each window is in a non-reflectance condition (e.g., no reflected light is falling on the window), a full reflectance condition (e.g., reflected light is falling on all portions of the window), a partial reflectance condition (e.g., reflected light is falling on only a portion of the window), and the like. ASCN 100 may thus consider a window and/or motor zone to be in a reflectance condition based on a user preference. For example, in an embodiment, ASCN 100 is configured to consider a window to be in a reflectance condition when the window is fully or partially in reflected light. In other embodiments, ASCN 100 is configured to consider a window to be in a reflectance condition when the window is fully in reflected light. In still other embodiments, ASCN 100 is configured to consider a window to be in a reflectance condition when at least 10% of the window is in reflected light. Moreover, ASCN 100 may consider a window to be in a reflectance condition by using any appropriate thresholds, measurements, and/or the like.

If the one or more windows and/or motor zones are in reflected light, CCS 110 may implement a reflectance override notification, and one or more window coverings may be moved at least partway toward a fully closed position (step 905). If one or more windows and/or motor zones are not in reflected light, CCS 110 may not implement a reflectance override notification, and one or more window coverings may be left in their current positions and/or moved at least partway towards a fully open position (step 907). Additionally, CCS 110 may be configured to not implement a reflectance override notification in response to one or more windows and/or motor zones being in reflected light for a limited period of time, such as between about one minute and thirty minutes. Moreover, CCS 110 may be configured to not implement a reflectance override notification if one or more windows and/or motor zones will be in reflected light for any desired length of time.

ASCN 100 may further be configured to enable and/or disable a reflectance override notification based on any suitable criteria, for example: the current ASHRAE and/or radiometer sky data readings (i.e., full spectrum information); the sky data readings from one or more photometers (i.e., oriented in any suitable manner, for example east-facing, west-facing, zenith-oriented, and/or the like); a combination of radiometer and photometer data readings; and/or the like. Moreover, data from one or more photometers may be utilized by ASCN 100 in order to calculate the need for a reflectance override notification. However, data from one or more radiometers may also be utilized. Further, in various embodiments, ASCN 100 may be configured to implement various averaging algorithms, thresholds, and the like in order to reduce the need for repeated movements or "cycling" of one or more window coverings 255.

In various embodiments, CCS 110 may be configured to implement a reflectance override notification when ASCN 100 is operating in clear sky mode. However, CCS 110 may also implement a reflection override notification, for example responsive to radiometer sky data, when ASCN is operating in any mode. In various embodiments, CCS 110 may be configured to implement a reflectance override notification when ASCN 100 observes measured solar radiation equal to or in excess of a particular threshold, for example 75 percent of ASHRAE calculated clear sky solar radiation. Further, the threshold utilized for implementing a reflectance override notification may be related to the threshold utilized for determining a sky condition (clear, cloudy, bright overcast, partly sunny, and the like). For example, in an embodiment, the threshold utilized for implementing a reflectance override notification may be 5% greater than the threshold for determining a clear sky condition. Additionally, when radiometers and photometers are employed, CCS 110 may be configured to implement a reflectance override notification only when ASCN 100 is operating under a particular mode or modes (clear sky, partly clear sky, and so forth). CCS 110 may thus assess data received from one or more photometers in order to see if the ambient lighting level is above a particular threshold. Moreover, in various embodiments, CCS 110 may be overridden by a bright overcast sky mode calculation wherein one or more window coverings are moved to a predetermined position, for example 50% of fully open.

Figure 10A:
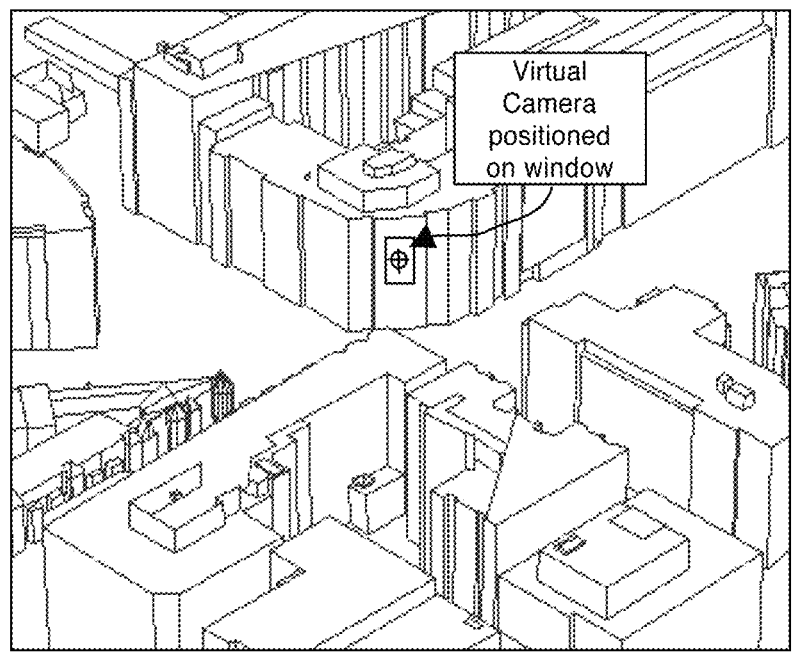
FIGS. 10A-10E illustrate reflectance modeling in accordance with various embodiments.
Figure 10B:
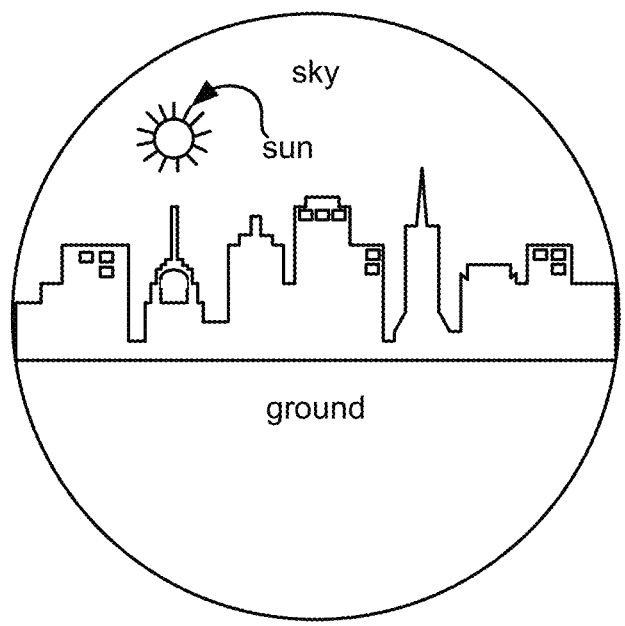

With reference now to FIGS. 10A to 10D, in various embodiments, a reflectance program is configured to determine if reflected light falls on a particular location on a building. A three-dimensional computer model of the building is constructed. As depicted in FIG. 10A, a virtual camera is placed at the location on the building model where reflectance is to be assessed. A three-dimensional computer model of surrounding objects (other buildings, bodies of water, and the like) is constructed. With this information, the virtual camera constructs a 180 degree hemispherical projection of all objects visible in the direction the camera is facing, as depicted in FIG. 10B. The position of the sun is plotted in the hemispherical projection. Depending on the position of the sun and the properties of the objects visible to the camera (e.g., reflective, non-reflective, and the like), the virtual camera location may be in a direct sunlight condition, shaded condition, a reflectance condition, and the like. For example, if the position of the sun is within the boundary of another building, and the building is not reflective, the building will cast a shadow onto the virtual camera location, resulting in a shaded condition.

Figure 10C:
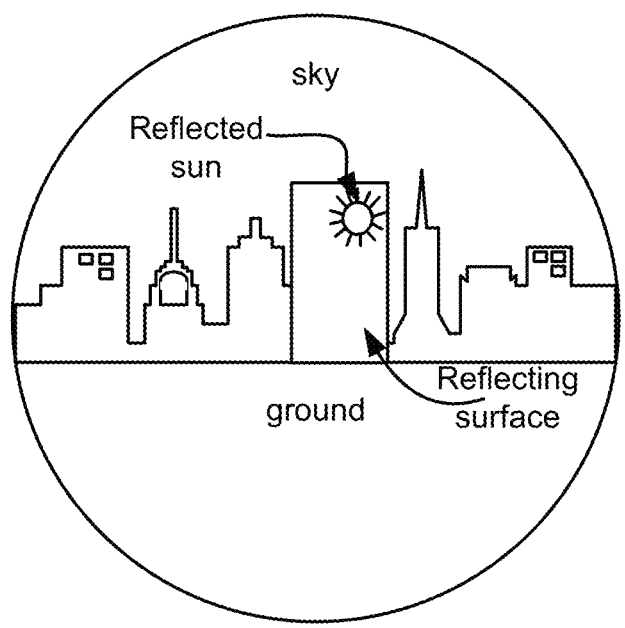

With reference now to FIG. 10C, in accordance with various embodiments, one or more reflecting surfaces are plotted in the hemispherical projection. Information about reflecting surfaces may be stored in a reflector table. For example, a reflector table may contain information characterizing the dimensions of the reflecting surface, the location of a reflecting surface, the azimuth of a reflecting surface, the altitude of a reflecting surface, and/or the like. Information from the reflector table may be utilized to plot one or more reflecting surfaces in the hemispherical projection. Moreover, for a defined sun position in the sky (azimuth and altitude), the sun may be reflected onto the virtual camera location by one or more of the reflecting surfaces. The reflected sun (and associated sunlight) has a position (azimuth and altitude) different from the actual sun location in the sky. The reflected sun is plotted on the hemispherical projection.

Figure 10D:
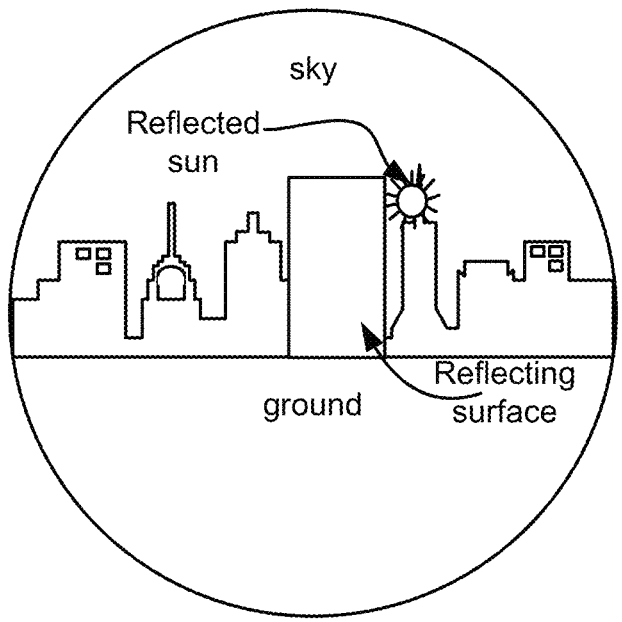

At this point, the reflected sun may fall within the bounds of at least one reflecting surface. If this occurs, the reflected sunlight will fall on the virtual camera, as illustrated in FIG. 10C. Alternately, the reflected sun may fall outside the bounds of any reflecting surface. In this event, no reflected sunlight falls on the virtual camera, as illustrated in FIG. 10D.

Figure 10E:
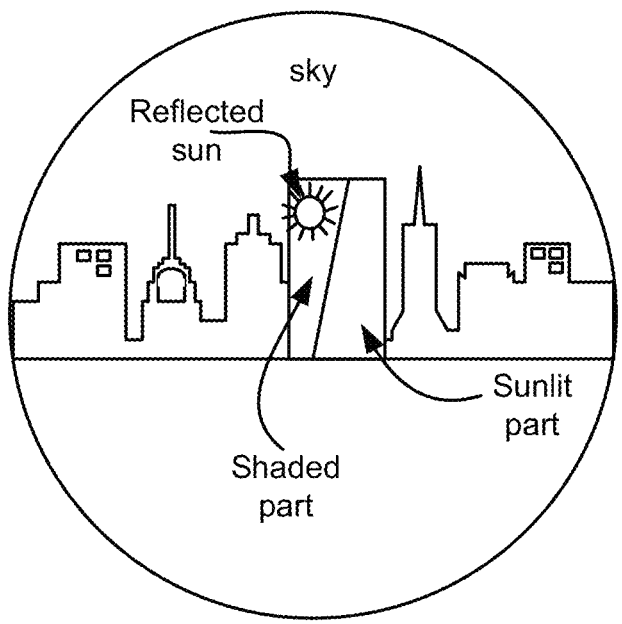

Moreover, as illustrated by FIG. 10E, a reflecting surface may itself be shaded. A reflectance program may test the location of the reflected sun to determine if the reflected sun is in the shaded or sunlit portion of a reflecting surface. If the reflected sun is on the sunlit part of the reflecting surface, the reflected sunlight will fall on the virtual camera. If the reflected sun is on the shaded part of the reflecting surface, no reflected sunlight will fall on the virtual camera. Moreover, a reflectance program may be configured to account for and properly model "self-shading", wherein a portion of a building casts a shadow onto another portion of the building, and "self-reflectance", wherein a portion of a building reflects light onto another portion of the building. In this manner, a reflectance algorithm may model, plot, determine, and/or otherwise calculate the presence and/or absence of specular reflections and/or diffuse reflections at any desired location. Moreover, reflectance information for complex building shapes (e.g., cruciform buildings, pinwheel-shaped buildings, irregular buildings, and/or the like) may thus be modeled, and one or more window coverings 255 may be moved accordingly.

In various embodiments, CCS 110 may occasionally calculate conflicting movement information for a motor zone (for example, via use one or more of algorithm 600, algorithm 700, algorithm 750, algorithm 800, algorithm 900, and/or the like). For example, a first portion of a motor zone may be in a shadowed condition, resulting in CCS 110 calculating a need to move at least one window covering toward a fully open position in accordance with algorithm 800. At the same time, a second portion of a motor zone may be in a reflectance condition—resulting in CCS 110 calculating a need to move at least one window covering toward a fully closed position in accordance with algorithm 900. In order to maintain brightness comfort, CCS 110 may be configured to allow the results of algorithm 900 to take priority over the results of algorithm 800. Stated another way, CCS 110 may be configured to give reflectance priority over shadow.

CCS 110 may be configured to execute one or more algorithms, including but not limited to algorithms 600, 700, 750, 800, and/or 900, on a continuous and/or real-time basis, on a scheduled basis (every ten seconds, every minute, every ten minutes, every hour, and the like), on an interrupt basis (responsive to information received from one or more sensors, responsive to input received from a user, responsive to a remote command, and the like), and/or any combination of the above. Moreover, CCS 110 may be configured to execute an algorithm, such as algorithm 600, independently. CCS 110 may also be configured to execute an algorithm, such as algorithm 600, simultaneously with one or more additional algorithms, such as algorithm 700, algorithm 750, algorithm 800, algorithm 900, and the like. Further, CCS 110 may be configured to turn off and/or otherwise disable use of one or more algorithms, such as algorithm 800, as desired, for example when conditions are overcast, cloudy, and the like. Moreover, CCS 110 may be configured to implement and/or execute any suitable number of algorithms at any suitable times in order to achieve a desired effect on an enclosed space.

As mentioned herein, ASCN 100 may be configured to communicate with a Building Management System (BMS), a lighting system and/or a HVAC system to facilitate optimum interior lighting and climate control. Moreover, ASCN 100 may communicate with a BMS for any suitable reason, for example, responsive to overheating of a zone, responsive to safety considerations, responsive to instructions from a system operator, and/or the like. For example, ASCN 100 may be used to determine the solar load on a structure and communicate this information to the BMS. The BMS, in turn, may use this information to proactively and/or reactively set the interior temperatures and/or light levels throughout the structure to avoid having to expend excessive energy required to mitigate already uncomfortable levels, and to avoid a lag time in response to temperature changes on a building. For example, in typical systems, a BMS responds to the heat load on a building once that heat load has been registered. Because changing interior environment of a building takes significant energy, time and resources, there is a substantial lag in response time by a BMS to that heat load gain. In contrast, the proactive and reactive algorithms and systems of ASCN 100 are configured to actively communicate to BMS regarding changes in brightness, solar angle, heat, and the like, such that BMS can proactively adjust the interior environment before any uncomfortable heat load/etc. on a building is actually registered.

Furthermore, ASCN 100 may be given the priority to optimize the window covering settings based on energy management and personal comfort criteria after which the lighting system and HVAC system may be used to supplement the existing condition where the available natural daylight condition may be inadequate to meet the comfort requirements. Communication with a lighting system may be imperative to help minimize the required photo sensor resources where possible and to help minimize situations where closed loop sensors for both the shading and lighting control algorithms may be affected by each other. For example, based on information from one or more brightness sensors, ASCN 100 may move at least one window covering into a first position. After ASCN 100 has moved a window covering, a lighting system may then be activated and select appropriate dimming for the room. However, oftentimes the lighting system may overcompensate an existing bright window wall where the lighting system may lower the dimming setting too far and thus create a "cave effect" whereby the illuminance ratio from the window wall to the surrounding wall and task surfaces may be too great for comfort. Proper photo sensor instrumentation for illuminance ratio control may be configured to help establish the correct setting for the shades as well as for the lights even though it may cost more energy to accomplish this comfort setting. In addition, the lighting sensor may also provide the shading system with occupancy information which may be utilized in multi-use spaces to help accommodate different modes of operation and functionality. For instance, an unoccupied conference room may go into an energy conservation mode with the window coverings being deployed all the way up or down in conjunction with the lights and HVAC to minimize solar heat gain or maximize heat retention. Furthermore, the window coverings may otherwise enter into a comfort control mode when the space is occupied unless overridden for presentation purposes.

ASCN 100 may also be configured to be customizable and/or fine-tuned to meet the needs of a structure and/or its inhabitants. For example, the different operating zones may be defined by the size, geometry and solar orientation of the window openings. ASCN 100 control may be configured to be responsive to specific window types by zone and/or to individual occupants. ASCN 100 may also be configured to give a structure a uniform interior/exterior appearance instead of a "snaggletooth" look that is associated with irregular positioning of window attachments.

ASCN 100 may also be configured to receive and/or report any fine-tuning request and/or change. Thus, a remote controller and/or local controller may better assist and or fine-tune any feature of ASCN 100. ASCN 100 may also be configured with one or more global parameters for optimizing control and use of the system. Such global parameters may include, for example, the structure location, latitude, longitude, local median, window dimensions, window angles, date, sunrise and sunset schedules, one or more communication ports, clear sky factors, clear sky error rates, overcast sky error rates, solar heat gain limits for one or more window covering positions, positioning timers, the local time, the time that the shade control system will wait before adjusting the shades from cloudy to clear sky conditions (or vise versa) and/or any other user-defined global parameter.

ASCN 100 may also be configured to operate, for example, in a specific mode for sunrise and/or sunset because of the low heat levels, but high sun spot, brightness, reflectance and veiling glare associated with these sun times. For example, in one embodiment, ASCN 100 may be configured with a solar override notification during the sunrise that brings window coverings 255 down in the east side of the structure and move them up as the sun moves to the zenith. Conversely, during sunset, ASCN 100 may be configured to move window coverings 255 down on the west side of the structure to correspond to the changing solar angle during this time period. In another embodiment, ASCN 100 may be configured with a reflectance override notification during the sunrise that brings window coverings 255 down in the west side of the structure due at least in part to light reflected onto the west side of the structure, for example light reflected off an adjacent building with a reflective exterior. Moreover, when trying to preserve a view under unobtrusive lighting conditions, a Sunrise Offset Override notification or a Sunset Offset Override notification may lock in the shade position and prevent the ASCN from reacting to solar conditions for a preset length of time after sunrise or a preset length of time before sunset.

Moreover, ASCN 100 may be configured with a particular subset of components, functionality and/or features, for example to obtain a desired price point for a particular version of ASCN 100. For example, due to memory constraints or other limitations, ASCN 100 may be configured to utilize the average solar position of each week of a solar year, rather than the average solar position of each day of a solar year. Stated another way, ASCN 100 may be configured to determine changes to the solar curve on a weekly basis, rather than on a daily basis. Moreover, ASCN 100 may be configured to support a limited number of motor zones, radiometers and/or photometers, proactive and/or reactive algorithms, data logging, and/or the like, as appropriate, in order to obtain a particular system complexity level, price point, or other desired configuration and/or attribute. Further, ASCN 100 may be configured to support an increased number of a particular feature (for example, motor zones), in exchange for support of a corresponding decreased number of another feature (for example, solar days per year). In particular, an ASCN 100 having a limited feature set is desirable for use in small-scale deployments, retrofits, and/or the like. Additionally, an ASCN 100 having a limited feature set is desirable to achieve improved energy conservation, daylighting, brightness control, and/or the like, for a particular building. Moreover, ASCN 100 may be configured as a stand-alone unit having internal processing functionality, such that ASCN 100 may operate without requiring computational resources of a PC or other general purpose computer and associated software.

For example, in various embodiments, ASCN 100 comprises a programmable microcontroller configured to support 12 motor zones. The programmable microcontroller is further configured to receive input from 2 solar radiometers. Moreover, in order to provide scalability, multiple instances of an ASCN 100 may be operatively linked (i.e. "ganged") together to support additional zones. For example, four ASCNs 100 may be ganged together to support 48 zones. Additionally, ASCN 100 is configured with an IP interface in order to provide networking and communications functionality. Moreover, ASCN 100 may be configured with a local communication interface, for example an RS-232 interface, to facilitate interoperation with and/or control of or by third-party systems. ASCN 100 may also be configured with one or more of a graphical user interface, buttons, switches, indicators, lights, and the like, in order to facilitate interaction with and/or control by a system user.

Further, in this exemplary embodiment, ASCN 100 may be configured with a basic event scheduler, for example a scheduler capable of supporting weekly, bi-weekly, monthly, and/or bi-monthly events. ASCN 100 may also be configured with a time-limited data log, for example a log containing information regarding manual and/or automatic shade moves, the solar condition for one or more days, system troubleshooting information, and/or the like, for a limited period of time (e.g., 30 days, or other limited period selected based on cost considerations, information storage space considerations, processing power considerations, and/or the like).

Moreover, in this exemplary embodiment, the programmable microcontroller of ASCN 100 may be configured to utilize a limited data set in order to calculate one or more movements for a window covering. For example, ASCN 100 may be configured to utilize one or more of ASHRAE algorithms, window geometry, window size, window tilt angle, height of the window head and sill off the floor, motor zone information, solar orientation, overhang information, window glazing specifications (i.e., shading coefficient, visible light transmission, and the like). ASCN 100 may then calculate solar angles and/or solar intensity (i.e., in BTUs or watts per square meter) for each motor zone and/or solar penetration for each motor zone. Based on a measured and/or calculated sky condition, one or more window coverings may then be moved to an appropriate position. ASCN 100 may further utilize both shade movements resulting from real-time calculations (for example, calculations based on sensor readings) as well as scheduled shade movements.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Any notification, communication, transmission and/or channel discussed herein may include any system or method for delivering content (e.g., data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® NT®, 95/98/2000/CE/Mobile, OS2, UNIX®, LINUX®, SOLARIS®, MacOS, PALM®OS®, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a PALM® mobile operating system, a WINDOWS® mobile operating system, an ANDROID® Operating System, APPLE® MS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, PALM® PILOT®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, Net-BIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA APPLE®ts, JAVASCNRIPT, active server pages (ASP), common gateway interface scripts (CGI), extensible markup language (XML), dynamic HTML, cascading style sheets (CSS), AJAX (Asynchronous JAVASCNRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA, JAVASCNRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCNRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional disclosure supports combinations of means for performing the specified functions, combinations of steps for performing the specified functions, and program instruction means for performing the specified functions. It will also be understood that the functions can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuuten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A window shade system comprising:
a first bracket;
a second bracket;
a shade tube extending between the first bracket and the second bracket;
a window shade wound around the shade tube;
a spring assembly configured to predispose the window shade to at least one of a fully extended position or a fully retracted position, wherein the spring assembly is loaded, in response to a chain within the first bracket being manually pulled; and
an electronic brake device that is engaged against a rotating hub, wherein the electronic brake device is configured to restrict the rotating hub by being engaged against the rotating hub and intermittently disengage from the rotating hub to cause the spring assembly to unload and the window shade to manually move in a plurality of positions between the fully extended position and the fully retracted position.

2. The system of claim 1, wherein the electronic brake device also restricts the chain within the first bracket.

3. The system of claim 1, wherein the electronic brake device is engaged against the rotating hub, in response to the chain within the first bracket being manually pulled.

4. The system of claim 1, further comprising a controller configured to communicate with the electronic brake device to provide instructions for the intermittent disengaging of the rotating hub and movement of the window shade in the plurality of positions.

5. The system of claim 4, further comprising an encoder configured to communicate with the controller, wherein the encoder is configured to track the plurality of positions of the window shade.

6. The system of claim 4, further comprising a scheduler configured to communicate with the controller.

7. The system of claim 6, wherein the scheduler is configured to provide a time of day to the controller, wherein the controller is configured to release the electronic brake device at the time of day.

8. The system of claim 4, further comprising an automation system schedule configured to communicate with the controller, wherein the automation system schedule is configured to provide a time of day to the controller, wherein the controller is configured to activate the electronic brake device at the time of day.

9. The system of claim 4, wherein the controller is configured to track the plurality of positions of the window shade based on time.

10. The system of claim 4, wherein the controller is configured to communicate with a remote input device.

11. The system of claim 4, wherein the controller is configured to wirelessly communicate over at least one of Bluetooth or WiFi with at least one of a remote input device or a smartphone.

12. The system of claim 1, wherein the brake includes a solenoid.

13. The system of claim 1, wherein the spring assembly is a lift assist mechanism.

14. The system of claim 1, wherein the electronic brake device interfaces with a bead keeper that defines one or more presets for the plurality of positions of the window shade.

15. The system of claim 4, wherein the controller is configured to receive, from a remote input device, input about an adjustment of the window shade, and wherein the adjustment is based on a suggested adjustment received by the remote input device.

16. The system of claim 15, wherein the suggested adjustment is based on at least one of a calculated shadow or a calculated reflected light at a location of the interest, and wherein the suggested adjustment optimizes at least one of daylighting or internal temperature at the location of interest.

17. The system of claim 16, wherein the suggested adjustment is also for adjusting an artificial lighting control system.

18. The system of claim 16, wherein the suggested adjustment is received by the remote input device, in advance of when a calculated shadow or a calculated reflected light is to be present at a location of interest.

* * * * *